(12) United States Patent
Honma

(10) Patent No.: US 8,165,007 B2
(45) Date of Patent: Apr. 24, 2012

(54) INFORMATION DETECTION DEVICE AND OPTICAL DISC DEVICE

(75) Inventor: Hiromi Honma, Kanagawa (JP)

(73) Assignee: Renesas Electronics Corporation, Kanagawa (JP)

( * ) Notice: Subject to any disclaimer, the term of this patent is extended or adjusted under 35 U.S.C. 154(b) by 0 days.

(21) Appl. No.: 12/942,418

(22) Filed: Nov. 9, 2010

(65) Prior Publication Data

US 2011/0110210 A1    May 12, 2011

(30) Foreign Application Priority Data

Nov. 10, 2009  (JP) ................................. 2009-257339

(51) Int. Cl.
*G11B 20/10* (2006.01)
(52) U.S. Cl. ............. 369/124.05; 369/124.07; 369/59.22
(58) Field of Classification Search .............. 369/59.21, 369/59.22, 124, 7, 124.04, 124.05, 47.18, 369/47.19, 59.17, 59.18, 53.31; 375/341, 375/262–265

See application file for complete search history.

(56) References Cited

U.S. PATENT DOCUMENTS

| | | | | |
|---|---|---|---|---|
| 5,588,011 A * | 12/1996 | Riggle | ......................... | 375/341 |
| 5,650,988 A * | 7/1997 | Kuribayashi | ............... | 369/59.22 |
| 6,148,043 A * | 11/2000 | Fujimoto | ..................... | 375/341 |
| 6,477,125 B1 * | 11/2002 | Hayami | ..................... | 369/59.22 |
| 6,532,337 B1 * | 3/2003 | Yoshinaka | ..................... | 386/269 |
| 6,836,511 B1 * | 12/2004 | Marukawa | ..................... | 375/232 |
| 7,289,408 B2 | 10/2007 | Miyaoka | | |
| 2006/0133252 A1 * | 6/2006 | Rapp | ........................ | 369/59.22 |
| 2007/0140088 A1 * | 6/2007 | Hino et al. | ............... | 369/124.07 |
| 2007/0211833 A1 * | 9/2007 | Lee et al. | ....................... | 375/341 |
| 2008/0152318 A1 * | 6/2008 | Tatsuzawa et al. | ............ | 386/124 |
| 2009/0316561 A1 * | 12/2009 | Nishimura et al. | ...... | 369/112.01 |
| 2010/0020660 A1 * | 1/2010 | Uchino et al. | ............... | 369/53.2 |
| 2010/0135142 A1 * | 6/2010 | Honma | ........................ | 369/100 |

FOREIGN PATENT DOCUMENTS

JP     2005-11385 A    1/2005
JP     2008-287763 A   11/2008

OTHER PUBLICATIONS

Masatsugu Ogawa et al., Development of HD DVD Drive Technology (Recording Technology), ITE Technical Report, vol. 28, No. 43, Jul. 2004, pp. 17-20.

* cited by examiner

*Primary Examiner* — Thang Tran
(74) *Attorney, Agent, or Firm* — Foley & Lardner LLP

(57) ABSTRACT

An information detection device includes an equalizer that equalizes the readout signal to a PR channel having equalization target levels of four or more values, and a Viterbi detector. The Viterbi detector generates branch metrics with the equalization target levels as reference levels to determine recording data from an output of the equalizer. The Viterbi detector has a mode of generating the branch metrics and determining the recording data by limiting at least one out of a maximum value and a minimum value of the equalization target levels.

8 Claims, 17 Drawing Sheets

REFERENCE CASE

REFERENCE CASE

REFERENCE CASE

REFERENCE CASE

REFERENCE CASE

REFERENCE CASE

INFORMATION DETECTION DEVICE AND OPTICAL DISC DEVICE

TECHNICAL FIELD

Reference to Related Application

This application is based upon and claims the benefit of the priority of Japanese patent application No. 2009-257339 filed on Nov. 10, 2009, the disclosure of which is incorporated herein in its entirety by reference thereto.

This invention relates to an information reproducing device for e.g., an optical disc. More particularly, it relates to improving the performance in PRML (Partial Response Maximum Likelihood) detection.

BACKGROUND

In keeping up with the recent tendency towards using multimedia equipment, a need has been felt to process a larger quantity of the information, including the video information, and to increase the capacity of a storage device used for recording the information. In particular, in the field of storage of the high-quality video information, the tendency is towards using a BD (Blu-ray Disc) which is larger in storage capacity than the DVD (Digital Versatile Disc). To increase the recording capacity of an optical disc or a HDD device, it is necessary to increase the recording density. Concomitantly, reducing an error rate to provide for sufficient reliability has become a crucial task. The following description is centered mainly about increasing the density of the optical disc.

In an optical disc, a light beam collected by an optical element is illuminated on a disc medium, and the information is detected by lightness/darkness of reflected light or by light polarization. A beam spot collected is finite and, the smaller its diameter, the higher may be the density in recording/reproduction. In this situation, an optical approach towards reducing the beam spot is progressing. The spot diameter is inversely proportionate to the NA (Numerical Aperture) of an objective lens and directly proportionate to the wavelength $\lambda$ of the laser beam. The spot diameter may thus be reduced by increasing the NA and by decreasing the wavelength $\lambda$. However, if NA is increased, the depth of focus becomes shallower, such that it becomes necessary to decrease the distance between the disc surface and the lens. Thus, limitations are imposed on increasing the NA. On the other hand, in a short wavelength laser, stability in high output oscillation and long useful life are requirements. Although the wavelength used is becoming shorter, as evidenced by use of an infrared laser ($\lambda=780$ nm) for a CD, a red laser ($\lambda=650$ nm) for DVD and a blue laser ($\lambda=405$ nm) for BD, limitations are again imposed on further reducing the wavelength.

Meanwhile, the MTF (Modulation Transfer Function), which is the frequency characteristic of a transmission route between an optical head and a disc medium, is in the form of an LPF (Low-Pass Filter) in which the gain in the high frequency range is decreased by reason of the finite beam spot. Hence, even if a rectangular wave is recorded, the readout waveform from a disc becomes dull. If the recording density is increased, a waveform to be read out at a specified time point interferes with a wavelength to be read out at another time point, a phenomenon known as inter-symbol interference. By reason of this inter-symbol interference, a recorded mark shorter than a preset length becomes difficult to reproduce. If conversely the recording mark is long, the frequency with which the phase information used for extracting the clock for synchronization is output is decreased, thus causing pulling-out of synchronization. It is therefore necessary to limit the mark length to less than a certain length. The recording data for the optical disc is encoded for recording from the above described perspective of signal processing. In particular, the RLL code (Run Length Limited Code) in which limitations are imposed on the length between transitions is preferentially used. For example, EFM (Eight to Fourteen Modulation), an 8/16 code or (1, 7) PP is used. The minimum run length of the PFM modulation code used for a CD and that of the 8/16 modulation code used for a DVD are 2 (d=2). The minimum run length of the (1, 7) PP, used in a BD of higher density, is 1. This code is 2/3 as is the (1, 7) RLL, and is featured by limitations imposed on the number of succession of shortest marks.

There is also known a technique termed waveform equalization. This technique uses an inverse filter that eliminates the inter-symbol interference. The technique emphasizes the high frequency components of the readout signal and hence suppresses the inter-symbol interference. However, the high frequency components of the noise are simultaneously emphasized, thus possibly deteriorating the SNR (Signal to Noise Ratio). In particular, if the recording density is increased, the deterioration of the SNR caused by waveform equalization is mainly responsible for errors in data detection. The PR (Partial Response) equalization is a system of waveform equalization that intentionally causes known inter-symbol interference to occur on purpose. In this technique, high frequency components are usually not emphasized, thus suppressing the SNR from deterioration.

Another effective detection system is the maximum likelihood detection system, according to which detection is carried out on a data sequence known to undergo certain state transitions. The detection performance may be improved by selecting such a time-series pattern, out of all possible time-series patterns, which has a smallest value of a mean square sum of errors. However, if the above processing is carried out on real circuits, difficulties are encountered in connection with the circuit size and the operational speed. Hence, an algorithm termed a Viterbi algorithm is usually employed to progressively select the path. In this case, the Viterbi algorithm is termed the Viterbi decoding or Viterbi detection.

A detection system, which is a combination of the above mentioned PR equalization and Viterbi detection, is known as PRML (Partial Response Maximum Likelihood) system, and detects data as it performs a sort of error correction. By PR equalization, correlation along the time direction is imparted to the readout signal. Hence, only specified state transitions are presented in the data sequence obtained on sampling the readout signal. The state transitions, thus specified, and a data sequence of the noise-corrupted actual readout signal, are compared to each other, and most probable state transitions are selected, whereby errors in data detection may be reduced. A PRML detection system, in which the modulation code with the minimum run length and a PR (1, 2, 2, 2, 1) channel are used, is described in Non-Patent Document 1. With this detection system, a broader detection margin may be obtained in high density recording/reproduction.

To improve the detection performance by Viterbi detection, it is necessary that the frequency characteristic of the read channel is made to be coincident with a specified PR equalization characteristic. In this case, such PR equalization characteristic that is as close to that of the read channel as possible is to be selected. In general, the frequency characteristic is corrected using a waveform equalizer so that the PR characteristic will be as close to the preset PR characteristic as possible. Among the techniques of adaptively correcting signal deterioration with time to improve the detection performance, there are an automatic equalization system and an adaptive equalization system. Among the algorithms of adaptive equalization of the sequential type, there are a zero forcing method and a mean square method. The adaptive equalization technique is highly advantageous in that initial device adjustment is unneeded.

The operation of Viterbi detection will now be described. FIG. 12 shows signal transition states of a signal $x_n$ obtained by sampling a readout signal of a DVD in timed relation to the channel clock followed by PR (1, 3, 3, 1) equalization. FIG. 13 depicts a trellis diagram in which state transitions of FIG. 12 are plotted along the time axis. The numbers affixed to branches extending from six states of the state transition diagram represent ideal amplitude values $r_n$ of $x_a$. For example, in an area composed of 4T spaces and 4T marks in succession in this order, the state sequence is $S_0 \rightarrow S_1 \rightarrow S_3 \rightarrow S_7 \rightarrow S_6 \rightarrow S_4 \rightarrow S_0 \rightarrow S_0 \rightarrow S_1 \rightarrow \ldots$ $x_n$ at this time is ideally $-4, -3, 0, 3, 4, 3, 0, -3, -4, -3, \ldots$. However, due to e.g., the noise, $x_a$ may become $-3.9, -2.9, 0.1, 2.7, 3.8, 2.9, 0.2, -2.6, -3.9, -3.1, \ldots$. Now suppose that the Gaussian noise be superposed on $x_n$ and $r_n$, assume any one of five reference levels ($\pm 14$, $\pm 3$, 0), it is then the maximum likelihood detection to find $r_n$ that minimizes $\Sigma(x_n-r_n)^2$. It is however difficult to compare all combinations in real time. In this consideration, the Viterbi algorithm sequentially performs the operation. As shown in FIG. 12, possible previous states of $S_0$ are $S_0$ and $S_4$, and possible previous states of $S_7$ are $S_3$ and $S_7$. Then referring to FIG. 14, the operation of selecting more plausible one of a plurality of paths entered simultaneously, such as states $S_0$ and $S_7$, is carried out at each time point. By tracing back the paths towards the past, the paths merge at a certain time point in one path (path merge). In short, the information prior to the merge time point may be identified.

For selecting one of the paths, an index for plausibility, termed a metric, is introduced. The plausibility $Pa_n$ that a time point n is a state Sa is termed a path metric. A square of the difference between $x_n$ and the reference level r is termed a branch metric $b_n(r)$.

$$b_n(r)=(x_n-r)^2 \quad (1)$$

Since the path metric is an integration of the branch metrics from the past, the smaller the path metric, the more plausible is the path metric. Since the path metric $P1_n$ is necessarily the state $S_0$ one time point before, the path metric $P1_n$ is a path metric $P0_{n-1}$, which is state $S_0$ one time point before, plus the branch metric $b_n(-3)$ at the present time point, as indicated by the equation (2):

$$P1_n=P0_{n-1}+b_n(-3) \quad (2)$$

In similar manner, $P3_n$, $P4_n$ and $P6_n$ are as indicated by the following equations (3) to (5):

$$P3_n=P1_{n-1}+b_n(0) \quad (3)$$

$$P4_n=P6_{n-1}+b_n(0) \quad (4)$$

$$P6_n=P7_{n-1}+b_n(3) \quad (5)$$

$P0_n$ is indicated by the equation (6). $P0_n$ is $S_0$ or $S_4$ one time point before, such that there are two paths. Out of the path metrics, a smaller one is selected. It should be noted that Min[a, b] denotes a or b, whichever is smaller.

$$P0_n=\text{Min}[P0_{n-1}+b_n(-4),P4_{n-1}+b_n(-3)] \quad (6)$$

In similar manner, $P7_n$ becomes as indicated by the following equation (7):

$$P7_n=\text{Min}[P7_{n-1}+b_n(4),P3_{n-1}+b_n(3)] \quad (7)$$

The path metrics are updated at every time point to select the path. The paths entered in all states merge in one path. Hence, by tracing back from a given time point towards the past, the paths merge to determine the information. Meanwhile, in the equations 6 and 7, it is sufficient that large-small comparison may be made between the path metrics. Since the terms $x_n^2$ in $b_n(r)$ are common to all path metrics, the following equation:

$$b_n(r)'=r^2-2rx_n$$

may be used as a branch metrics, whereby the circuit may be simplified to advantage.

Meanwhile, this processing is usually carried out in terms of a channel clock as a unit. Hence, a high speed processing is required. For example, at a speed eight times as fast as the DVD, the channel clock frequency exceeds 200 MHz. Hence, the processing is generally carried out by a dedicated circuit. FIG. 15 depicts a block diagram of a Viterbi detector. A path metric-branch metric addition circuit (Add), a path metric value comparator circuit (Compare) and a path selection circuit that selects the path based on the result of comparison (Select) are collectively termed an ACS circuit 52. Further, a circuit for calculating the branch metric 51 (BMG) and a memory (MEM) 53 that holds the path selection information, termed a path memory, are needed. It has been known that, if the signal level distribution after adaptive equalization for each reference level is proximate to the normal distribution, PRML detection by a Viterbi detector is able to detect even a low SNR signal that may not be detected by level detection. The low SNR signal not being detected by level detection may be exemplified by such a case where a signal has a good recording mark quality but suffers from significant jitter, a case where a signal suffers from significant inter-symbol interference, and a case where a signal has been reproduced in the defocused state.

There are however cases where the performance of a PRML detection system is inferior to that of the conventional level detector. These cases may be met when a mark non-optimum in shape has been recorded on a disc mainly due to failure (unmatching) of power control in recording. FIG. 6 shows a typical readout waveform of a 5T space+11T mark, in which the mark is a long mark suffering from distortion. Such mark has been formed by a recording strategy in which the recording power is to be reduced at the leading end of the long mark. In the level detection, an edge (transition) position of 5T space to −11T mark is closer to the 5T side, and hence may be detected without errors by bi-level slice detection. On the other hand, suppose now that the edge position be detected by PRML. In this case, one out of an ideal path (5T+11T, correct solution) and an ideal path 2 (6T+10T, error) is selected. Thus, path metrics of the two paths are now to be found. In Table 1, square values of the differences between the ideal values and x, at each time point, viz., branch metric values, are shown for the ideal paths 1, 2 in the PR (1, 3, 3, 1) channel.

TABLE 1

| time n | $x_n$ | ideal path 1 $(r_n)$ | $(x_n - r_n)^2$ | ideal path 2 $(r2_n)$ | $(x_n - r2_n)^2$ |
|---|---|---|---|---|---|
| 3 | −4.1 | −4 | 0.01 | −4 | 0.01 |
| 4 | −3.5 | −3 | 0.25 | −4 | 0.25 |
| 5 | −1.1 | 0 | 1.21 | −3 | 3.61 |
| 6 | 1.5 | 3 | 2.25 | 0 | 2.25 |
| 7 | 2.0 | 4 | 4 | 3 | 1 |
| 8 | 2.2 | 4 | 3.24 | 4 | 3.24 |
| Σ | — | — | 10.96 | — | 10.36 |

The sum of the branch metrics gives a path metric. In a Viterbi detector, one of the two paths having a smaller path metric value is determined to be more plausible. The path metric for the ideal path 1 is 10.96, whereas that for the ideal path 2 is 10.36. Hence, the path 2 with the smaller path metric is selected, which results in an error detection.

FIG. 8 shows a typical readout waveform of a 6T space+ 10T mark whose long mark suffers from distortion. Such mark has been formed by a recording strategy in which the recording power is to be increased at the leading end portion of the long mark. In the level detection, an edge position of 6T space to 10T mark is closer to the 10T mark side, and hence may be detected without errors by bi-level slice detection. On the other hand, suppose now that this be detected by PRML. In this case, an ideal path (5T+11T, error) or an ideal path 2 (6T+10T, correct solution) is to be selected. Path metrics of the two paths are now to be found. In Table 2, square values of the differences between the ideal values and x, at each time point, viz., branch metric values, are shown for the ideal paths 1, 2 in the PR (1, 3, 3, 1) channel.

TABLE 2

| time n | $x_n$ | ideal path 1 ($r_n$) | $(x_n - r_n)^2$ | ideal path 2 ($r2_n$) | $(x_n - r2_n)^2$ |
|---|---|---|---|---|---|
| 3 | −4.1 | −4 | 0.01 | −4 | 0.01 |
| 4 | −3.5 | −3 | 0.25 | −4 | 0.25 |
| 5 | −1.2 | 0 | 1.44 | −3 | 3.24 |
| 6 | 1.0 | 3 | 4.0 | 0 | 1.0 |
| 7 | 4.5 | 4 | 0.25 | 3 | 2.25 |
| 8 | 4.1 | 4 | 0.01 | 4 | 0.01 |
| Σ | — | — | 5.96 | — | 6.76 |

The sum of the branch metrics gives a path metric. In the Viterbi detector, one of two paths which has a smaller path metric value is determined to be more plausible. The path metric for the ideal path 1 is 5.96, while that for the ideal path 2 is 6.76. Hence, the path 1 with the smaller path metric is selected, which results in an error detection.

The level detection is a conventional technique used in many optical disc drives. Even in an optical disc drive, provided with a Viterbi detector, which has come to be used these days, reproduction compatibility with respect to a disc recorded with a conventional drive is indispensable. It is true that, in detection by PRML, the reproduction performance may be expected to be improved. However, in detecting a readout signal with strong non-linearity, such as a case with a non-optimum recording mark, the detection performance may become inferior to that with threshold detection, which is counted as a drawback.

Patent Document 1 discloses a measure to be taken in avoiding the deterioration in the performance in the detection by PRML of a signal suffering from waveform distortion. FIG. 16 shows an arrangement of the Viterbi detector. An ACS circuit 102 takes charge of addition of path metrics and branch metrics generated by a branch metric generation circuit 101, comparison of path metric values, and path selection which is based on the results of comparison. A path memory 103 processes the path selection information. A maximum likelihood decision unit 104 selects and outputs data which represents the smallest path metric value. However, upon path selection, the information obtained on comparing an input signal entered to the Viterbi detector at a time point a preset number of channel clocks before, and a threshold value α, to each other by a comparator 106 is used to make the latest path decision, in addition to the path metric values. In particular, if the input signal at the time point a preset number of channel clocks before has an amplitude corresponding to that of a mark, such a path where the marks are consecutively arrayed is selected. If otherwise, path selection is made on the basis of the path metric values. By such path selection, such a path where marks are consecutively arrayed may be selected even in case there is mark distortion, thus prohibiting an error in data detection.

Patent Document 2 discloses an alternative method for detecting the waveform distortion by PRML. FIG. 17 depicts a block diagram showing its formulation. In this method, the information recorded on a magneto-optical recording medium of domain wall displacement detection type 204 is read out by a magnetic head 206 and an optical head 205. The waveform distortion produced at this time is removed at the outset by a limiter circuit 201. After equalization by a PR equalizing circuit 202 to a PR (1, −1) channel, the waveform distortion is detected by a Viterbi detection circuit 203.

[Patent Document 1] JP Patent Kokai Publication No. JP-P2008-287763A, which corresponds to US Patent Application Publication No. US2010/0135142A1.

[Patent Document 2] JP Patent Kokai Publication No. JP-P2005-011385A, which corresponds to US Patent Application Publication No. US2004/0252589A1.

[Non-Patent Document 1] Ogawa, Homma et al., 'Development of Technology of FID DVD Device Implementation (Recording Technique), Technical Report for Society of Information Media, ITE Technical Report, Vol. 28, No. 43, pp. 17 to 20, MMS2004-38, CE2004-39 (July 2004)

SUMMARY

The disclosures of the above Patent Documents 1 to 2 and Non-Patent Document 1 are incorporated herein by reference thereto. The following analysis is made by the present invention. The technique of Patent Document 1 is effective against distortion in which a center part of a long mark is recessed. This is not so in a case shown in FIG. 6 or 8 in which the leading end of a mark suffers from significant distortion. The reason is that, since whether or not the state $S_0$ or $S_7$ is to be maintained is determined based solely on past input amplitudes, an error in detection accompanying an edge shift may not be coped with. On the other hand, the technique of Patent Document 2 is specialized in magneto-optical recording/reproduction of domain wall displacement type. Hence, this technique may not be applied to reproduction of a routine DVD or BD disc. In addition, if the method is adapted to the routine DVD or the like, high frequency components are superposed on a limiter output in the vicinity of the limiter amplitude and emphasized by waveform equalization. In this case, the probability is high that the performance in Viterbi detection is significantly degraded.

There is thus a demand for an information detection device and an optical disc device of a simplified constitution in which, even if a recording medium including an optical disc device such as DVD or BD suffers from waveform distortions inclusive of distortion at the leading end of a mark, playback may be made satisfactorily.

According to a first aspect of the present invention, there is provided an information detection device for discriminating recording data from a readout signal of an information recording medium that includes an equalizer and a Viterbi detector. The equalizer equalizes the readout signal to a PR (Partial Response) channel having equalization target levels of four or more values. The Viterbi detector generates a branch metric(s), with the equalization target levels as reference levels, in determining recording data from an output of the equalizer. The Viterbi detector has a mode of generating the branch metric(s) to determine the recording data by limiting at least one out of a maximum value and a minimum value of the equalization target levels.

According to a second aspect of the present invention, there is provided an optical disc device for reading out information recorded on an optical disc medium that includes an equalizer, a limiter circuit and a Viterbi detector. The equalizer equalizes a readout signal obtained from a readout head to a PR channel having equalization target levels of four or more values. The limiter circuit limits an amplitude value of an output of the equalizer to a preset level. In determining recording data from the output of the limiter circuit, the Viterbi detector generates branch metrics, as the equalization target levels of the four or more values less the equalization target levels having amplitude widths limited by the limiter circuit are used as reference levels.

The meritorious effects of the present invention are summarized as follows.

The Viterbi decoder provided in accordance with the present invention is able to determine recording data as at least one out of the maximum value and the minimum value of the equalization target levels of the equalizer is limited to generate branch metrics. Hence, a recording medium, including an optical disc device, such as DVD or BD, may satisfactorily be reproduced even in case the recording medium suffers from waveform distortion, including the distortion at the leading end of the mark.

PREFERRED MODES

Figure 1:
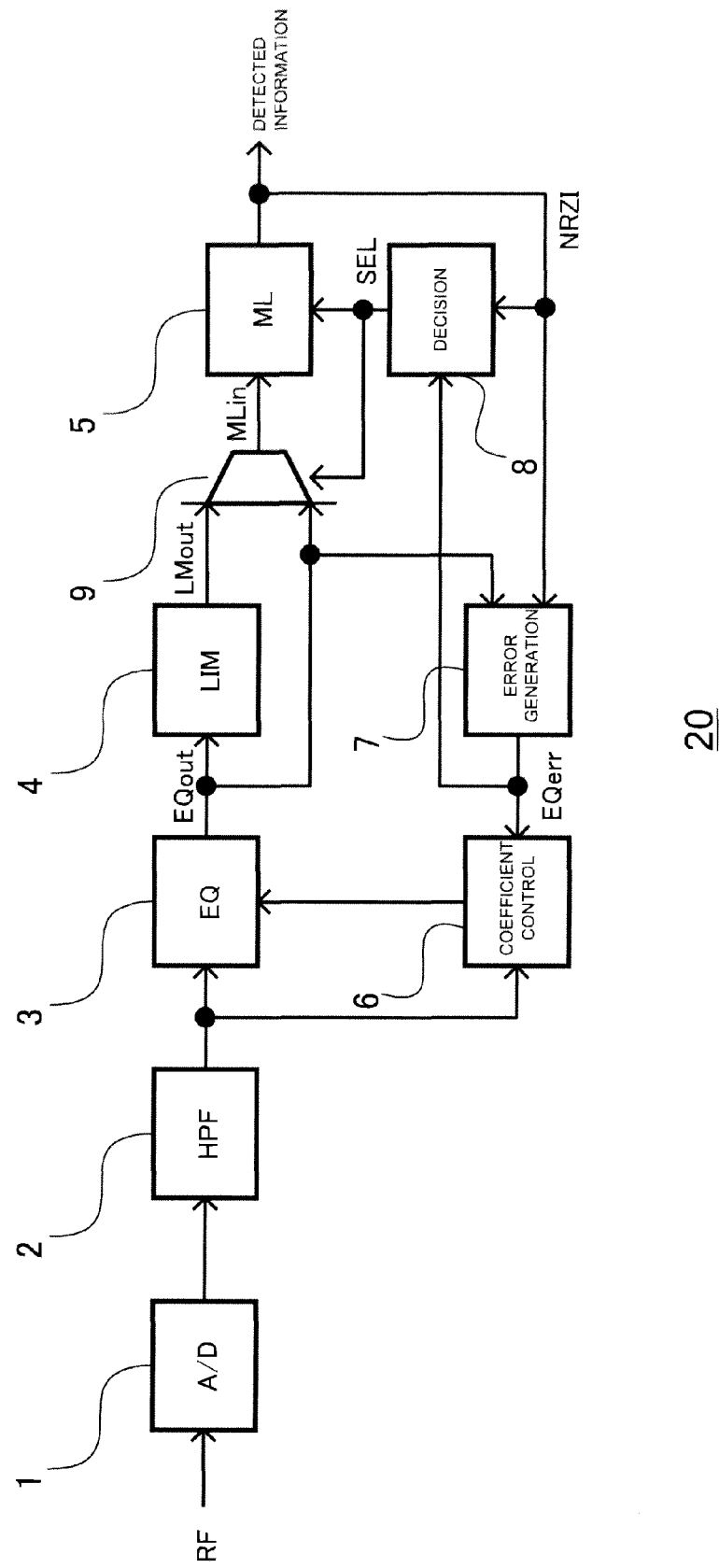
FIG. 1 is a block diagram showing a formulation of an information detection device according to an Example of the present invention.

Before proceeding to detailed description of Examples of the present invention, the schemata of an exemplary embodiment of the present invention will be described. It should be noted that the drawings and reference numerals used therein are shown merely for illustrating the exemplary embodiment(s) and are not intended to limit variations of the exemplary embodiment(s).

An information detection device according to an exemplary embodiment of the present invention, shown for example in FIG. 1, is an information detection device 20 for discriminating recording data from a readout signal of an information recording medium. The information detection device includes an equalizer 3 that equalizes the readout signal to a PR (Partial Response) channel having equalization target levels of four or more values, and a Viterbi detector 5. The Viterbi detector 5 generates branch metrics, with the equalization target levels as reference levels, in determining recording data from an output EQout of the equalizer. The Viterbi detector has a mode of generating the branch metrics and determining the recording data as limitations are imposed on at least one out of a maximum value and a minimum value of the equalization target levels (see FIG. 4). By this arrangement, the recorded data may be reproduced satisfactorily in particular in case the leading end of the mark suffers from distortion.

There may further be provided a limiter circuit 4 that, when the Viterbi detector 5 is in a mode of limiting the equalization target levels to determine the recorded data, limits the amplitude value of the equalizer output EQout to a preset level to deliver the equalizer output, limited in amplitude, to the Viterbi detector. By providing the limiter circuit 4, the waveform may be satisfactorily reproduced even in case the waveform is distorted in the amplitude increasing direction.

Figure 6:
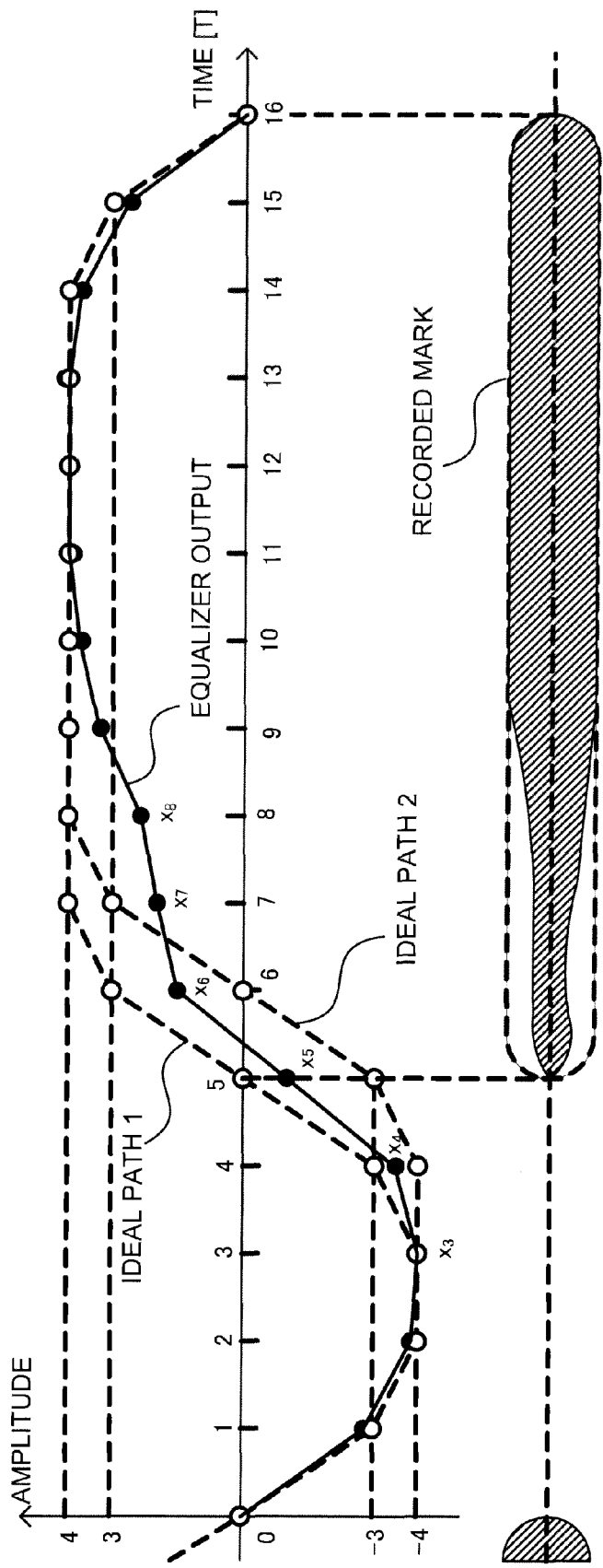
FIG. 6 is a graph-waveform diagram showing an equalizer output for a readout signal in which the leading end of a long mark has been recorded to a reduced thickness.
Figure 8:
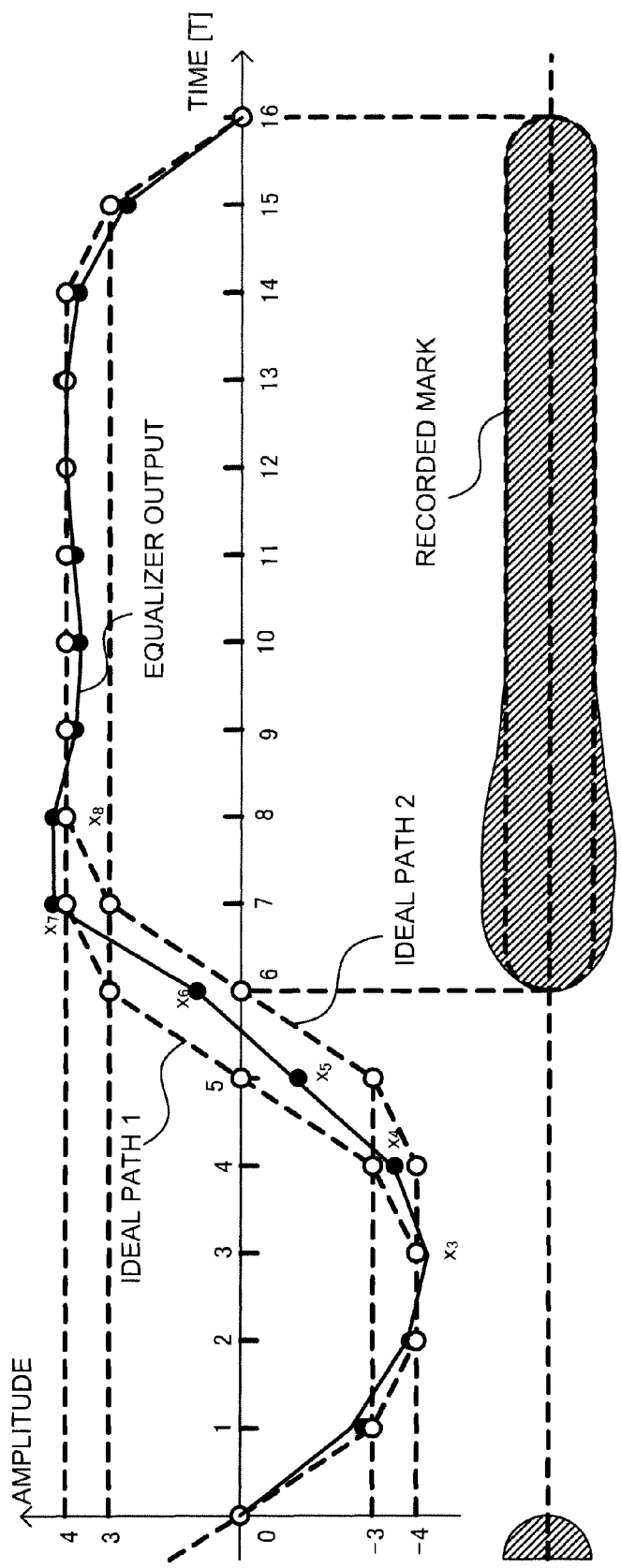
FIG. 8 is a graph-waveform diagram showing an equalizer output for a readout signal in which the leading end of a long mark has been recorded to a thicker thickness.
Figure 11:
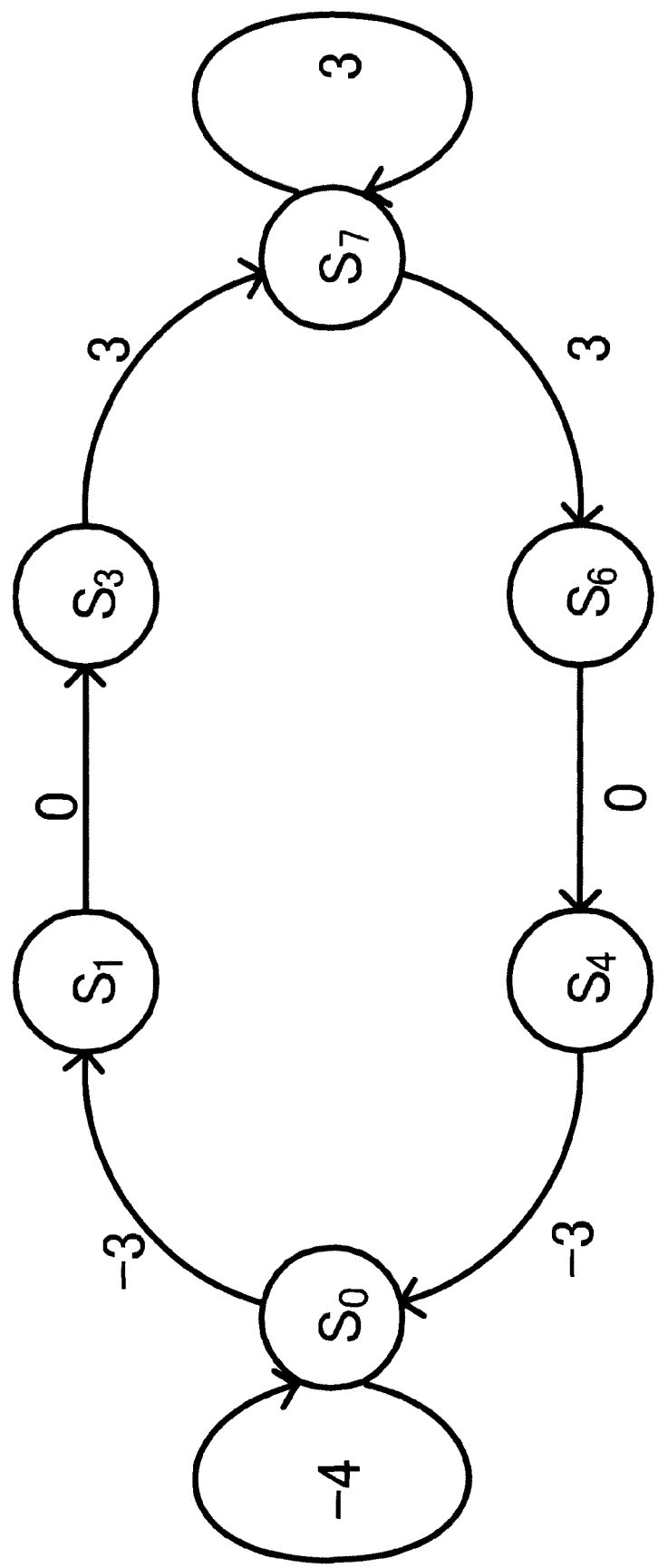
FIG. 11 is a state transition diagram in a PR (1, 3, 3, 1) channel for a limiter output of a recording code with d=2 limitations.
Figure 12:
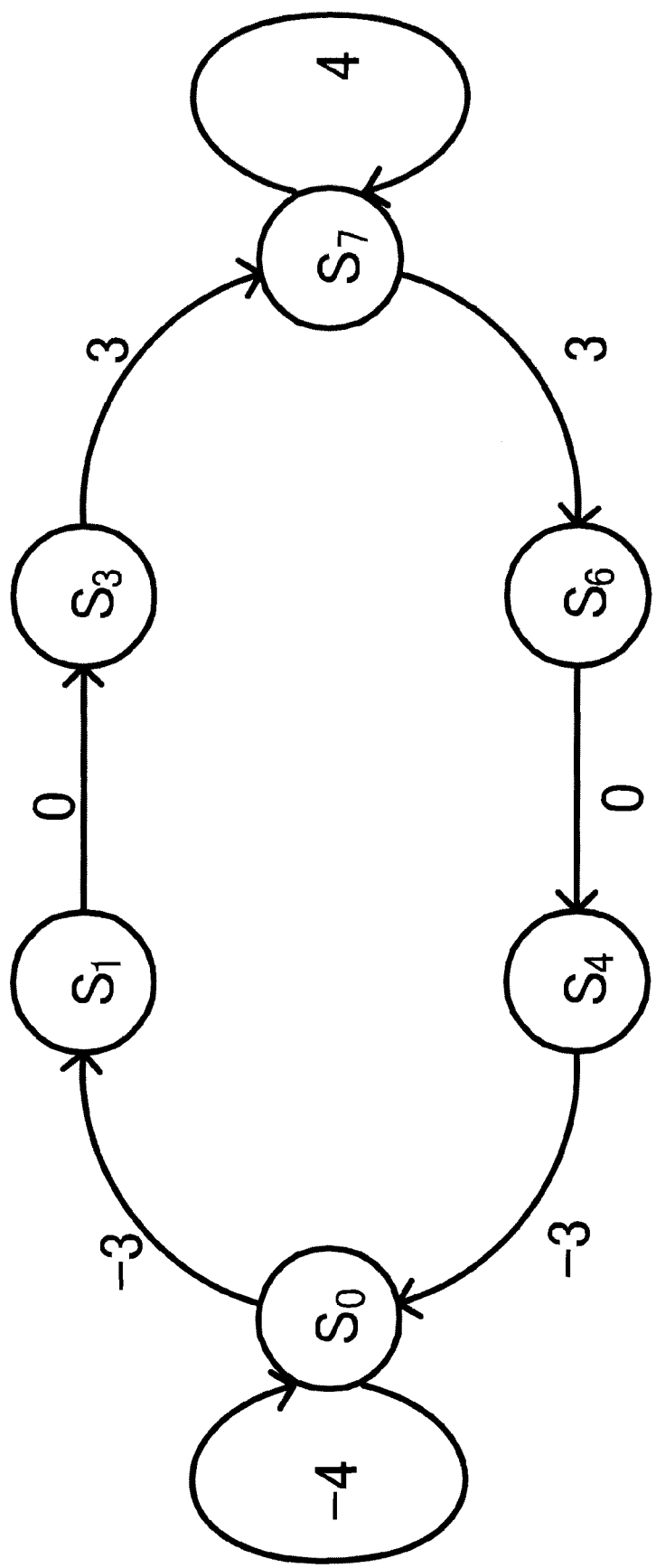
FIG. 12 is a state transition diagram in the PR (1, 3, 3, 1) channel of a recording code with d=2 limitations.
Figure 13:
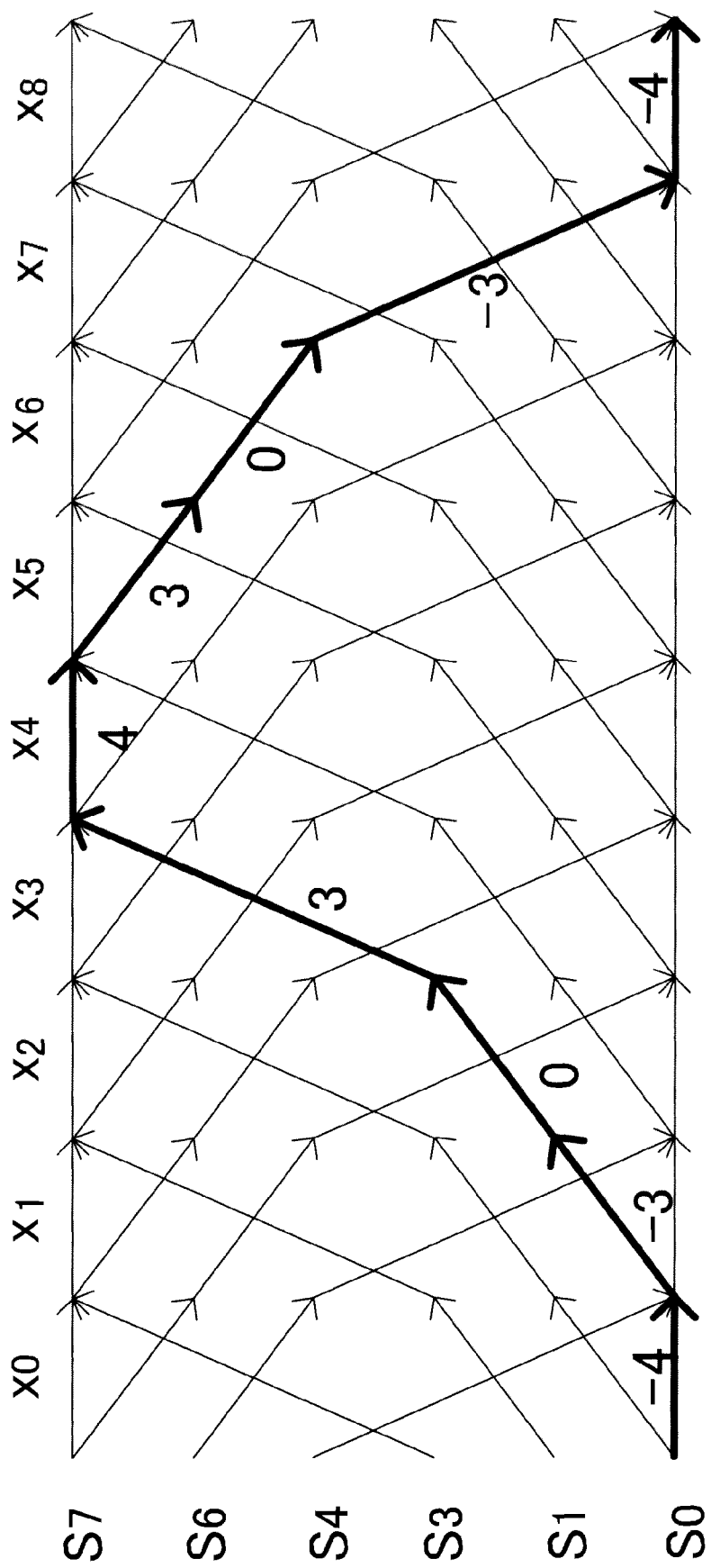
FIG. 13 is a trellis diagram in the PR (1, 3, 3, 1) channel of a recording code with d=2 limitations.
Figure 14:
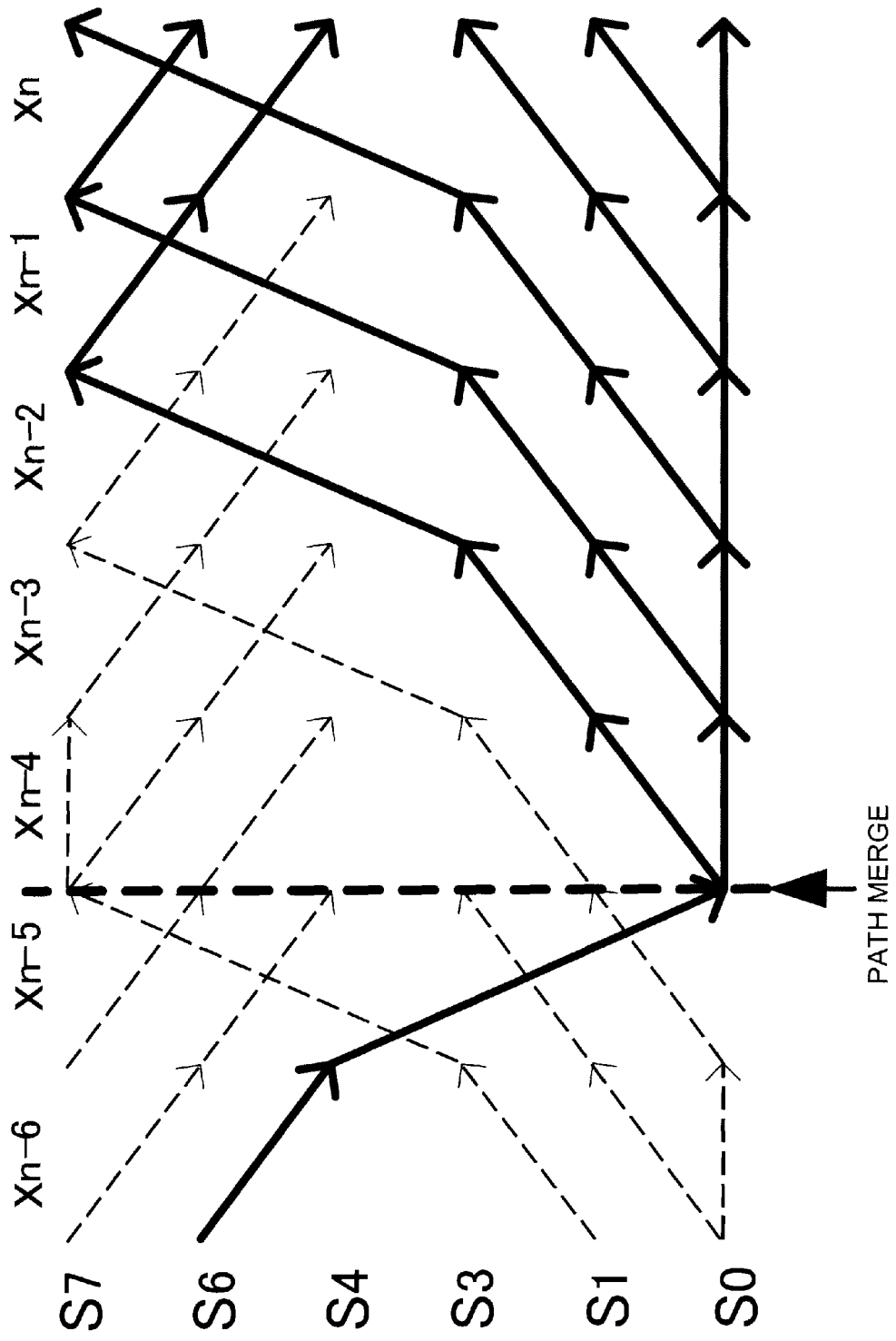
FIG. 14 is a diagram showing a typical path merge in Viterbi detection in the PR (1, 3, 3, 1) channel of a recording code with d=2 limitations.
Figure 15:
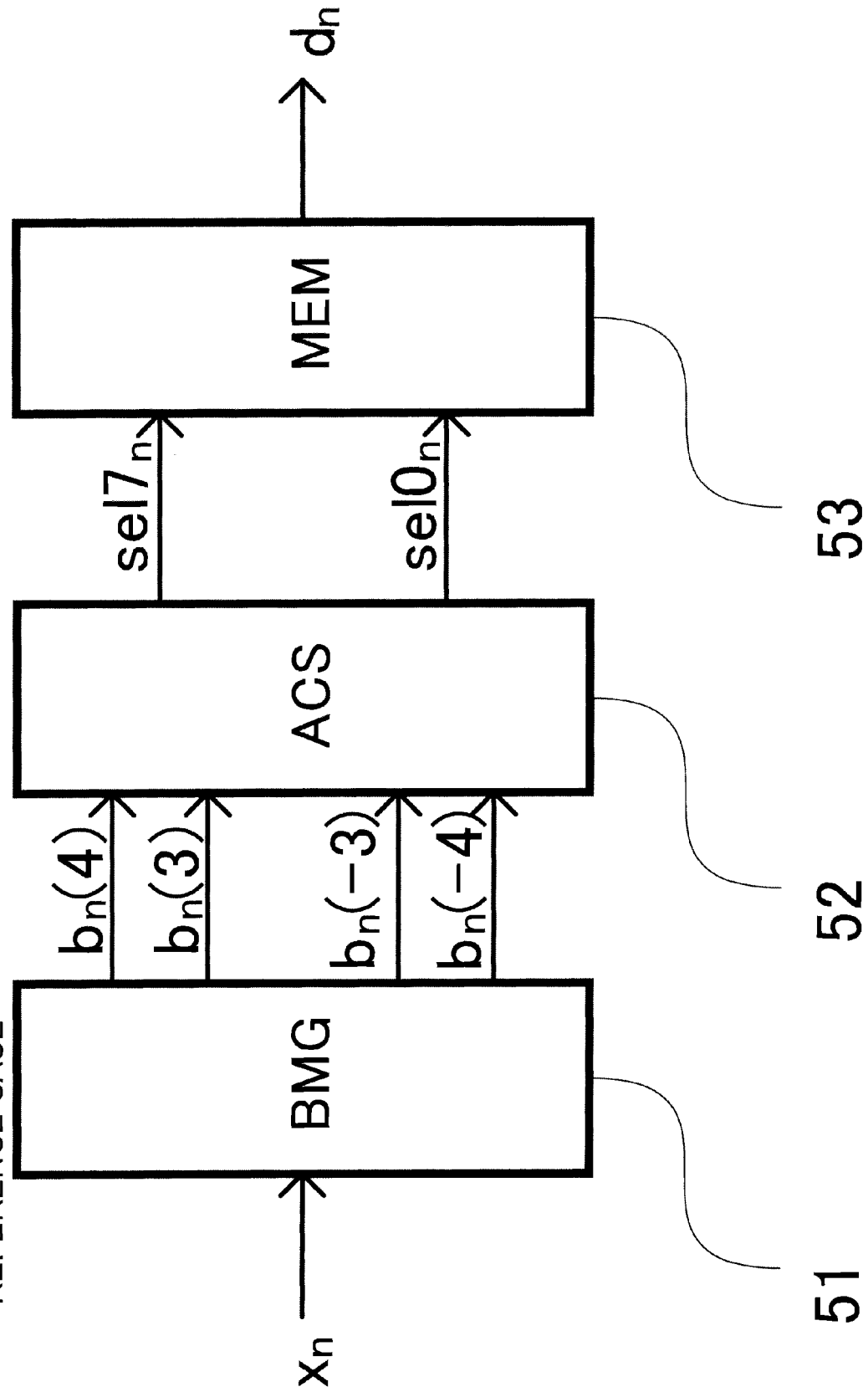
FIG. 15 is a block diagram showing a circuit formulation of a conventional Viterbi detector.
Figure 16:
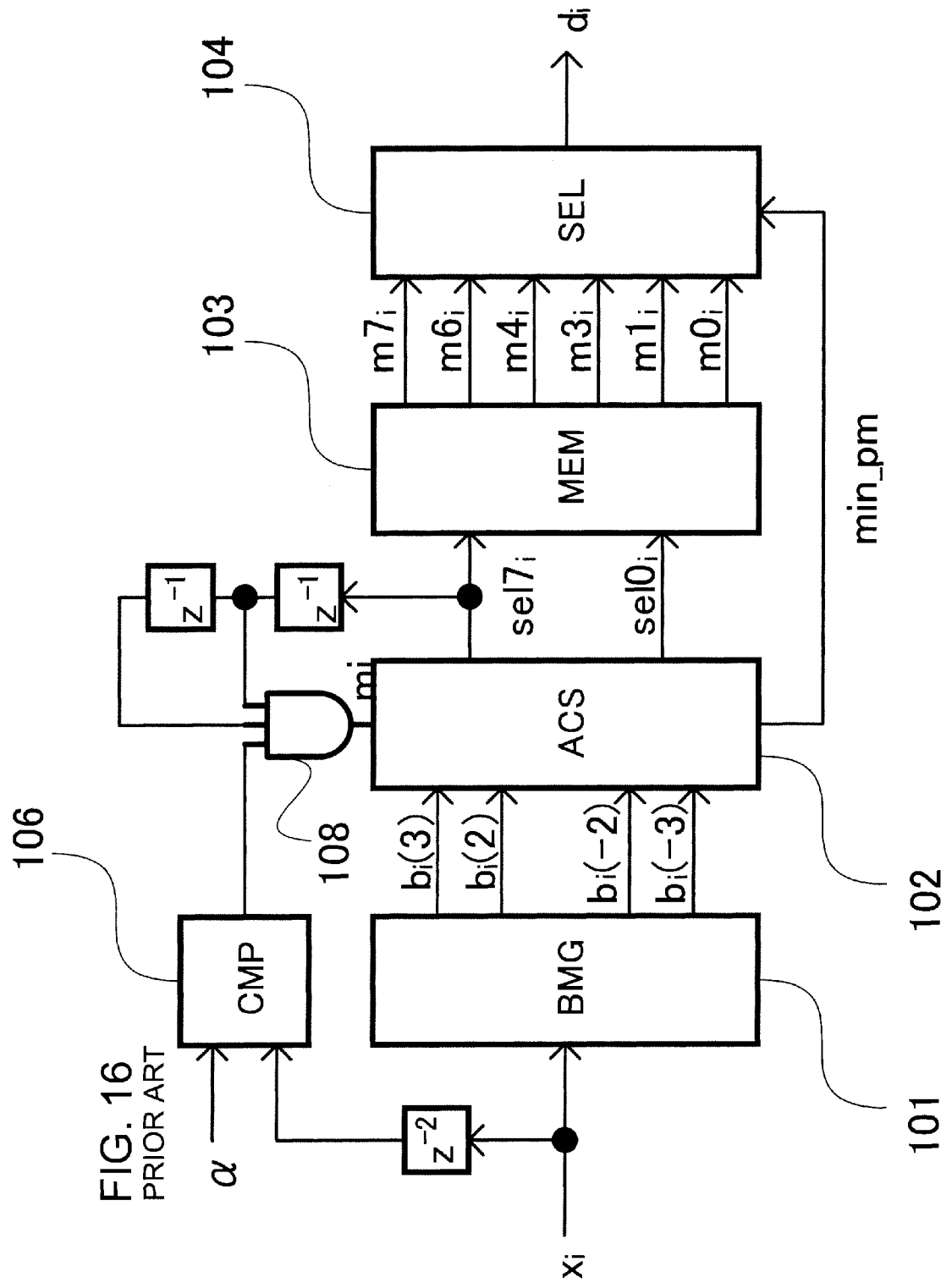
FIG. 16 is a block diagram of a conventional Viterbi detector, shown in Patent Document 1, in which long mark distortion has been taken into account.
Figure 17:
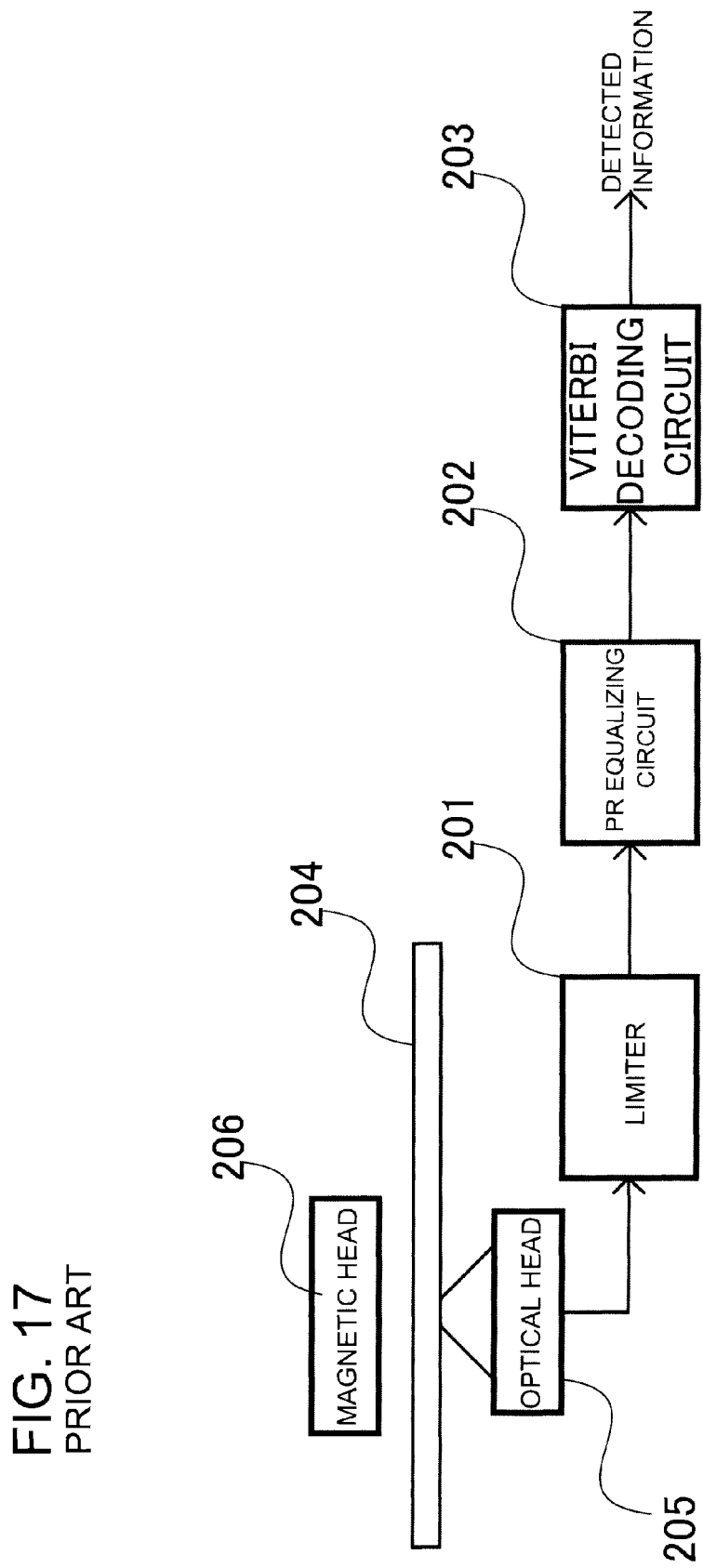
FIG. 17 is a block diagram of a conventional magneto-optical reproducing device, shown in Patent Document 2, in which waveform distortion has been taken into account.

The reason the playback performance is deteriorated in the case of the waveform distortion shown in FIG. 6 or 8 is that an error between the reference level and the actual waveform data sequence is locally increased. In particular, $x_n$, anticipated to rise inherently to close to the amplitude 4, is detected as a smaller (larger) value. That is, the branch metric is increased such that a difference may hardly be produced in the path metrics. If conversely the amplitude is limited by a limiter in an as-equalized data string, for example, the maximum amplitude is limited to 3, and detection is made in the Viterbi detector in a channel that takes account of the limiter effect (FIG. 11), the equalization error may be decreased to improve the detection performance.

If the wavelength distortion is mainly the distortion in the amplitude decreasing direction, the limiter circuit 4 is not mandatory.

There may further be provided a distorted state decision unit 8 that decides on the value of distortion of a readout signal, and that, in case of the distortion being of a larger value, sets the Viterbi detector 5 to the mode of imposing limitations on the equalization target level to determine the recording data. By providing the distorted state decision unit 8, it becomes possible to automatically decide on the value of distortion of the readout signal to provide for satisfactory reproduction regardless of whether there is or there is no distortion. At least a part of the function may be taken charge of by a firmware (F/W) which is run by a processor provided in association with the information detection device 20. In the latter case, the firmware as well as the processor that runs the firmware in operation is to be included in the distorted state decision unit 8.

There may further be provided a selector 9 that receives an output of the equalizer 3 and an output of the limiter circuit 4 to select one of the outputs to deliver the so selected output MLin to the Viterbi detector 5. There may additionally be provided a distorted state decision unit 8 that decides on the value of distortion of a readout signal, and that, in case of the distortion being of a larger value, sets the Viterbi detector 5 to the mode of imposing limitations on the equalization target levels to determine the recording data and sets the selector 9 to select outputs of the limiter circuit 4.

Figure 3:
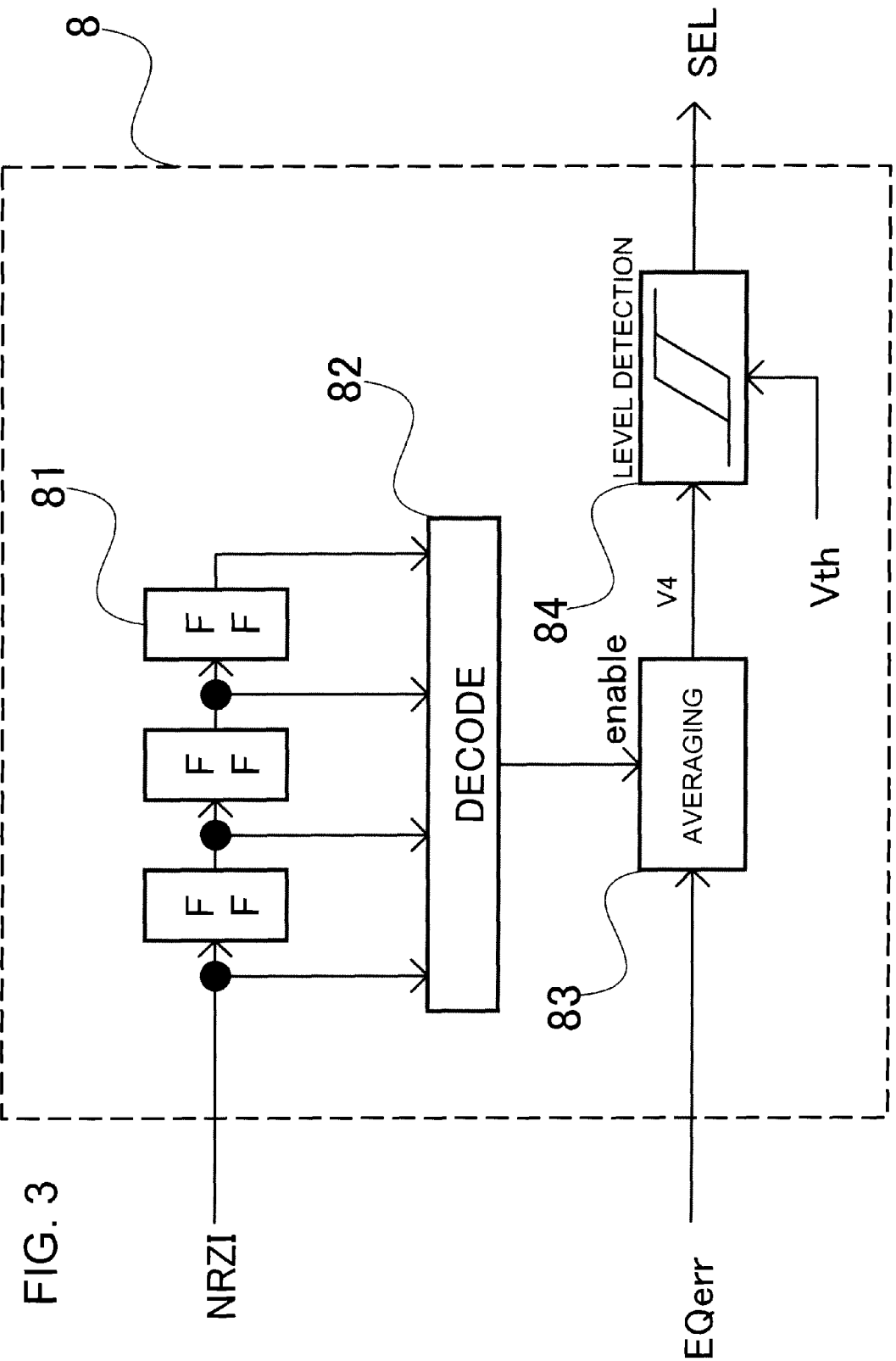
FIG. 3 is a block diagram showing a formulation of a distorted state decision unit in the above Example.

It is also possible that the distorted state decision unit 8 averages out the equalization error EQerr for a particular pattern to genetate an averaged output V4, as shown for example in FIG. 3. The distorted state decision unit 8 may compare the averaged output V4 and a preset threshold value Vth to each other to decide on the distortion value. An output signal SEL of the distorted state decision unit 8 may be supplied to the Viterbi detector 5 and the selector 9.

Figure 4:
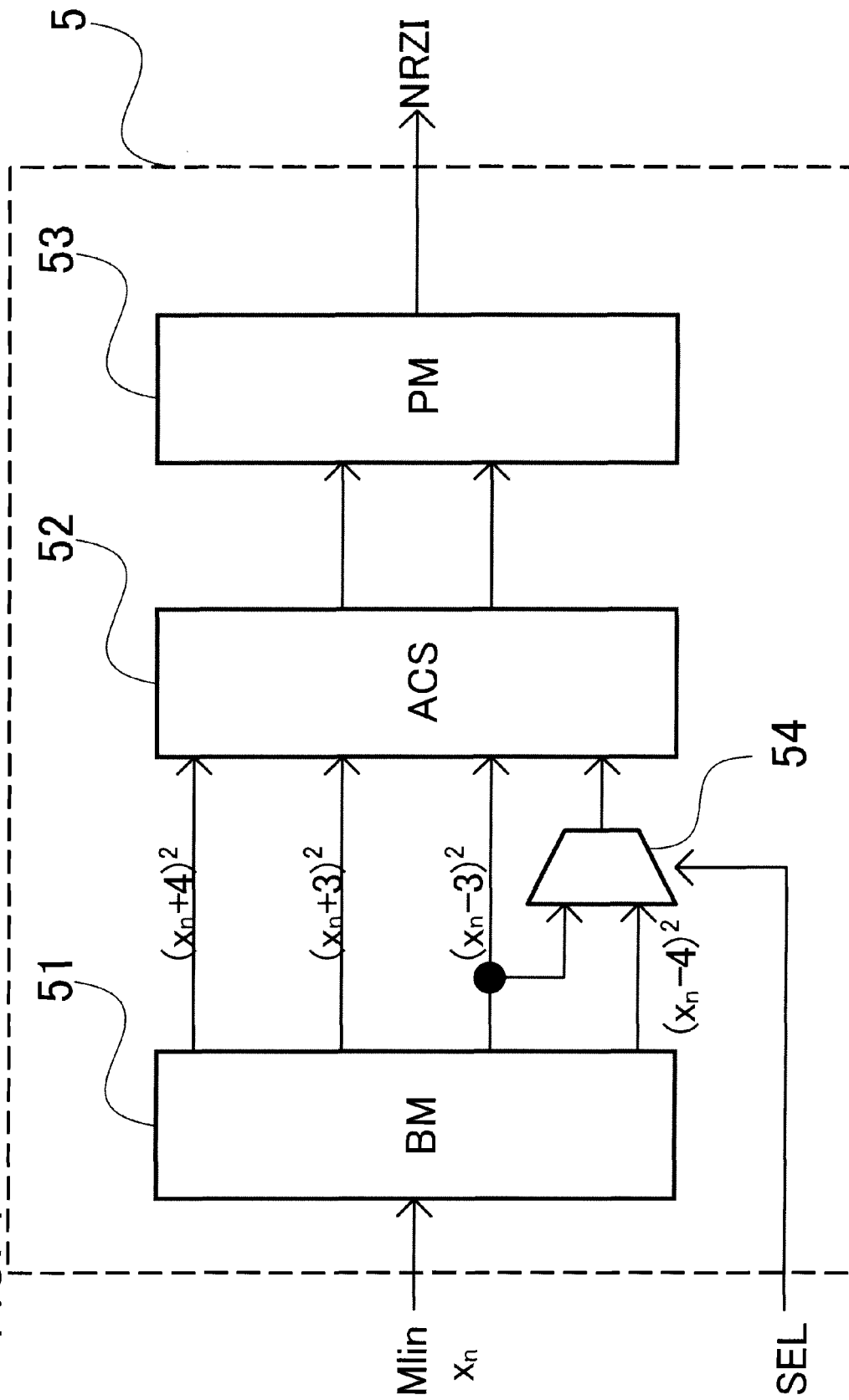
FIG. 4 is a block diagram showing a formulation of a Viterbi detector in the above Example.

The Viterbi detector 5 may be arranged as shown for example in FIG. 4 in which, in case limitations are imposed on the maximum value of the equalization target level, the equalization target level of a second largest value is rendered the reference level of the maximum value to generate the branch metric to determine the recording data. Also, in case the limitations are imposed on the minimum value of the equalization target level, the equalization target level of a second smallest value is rendered the reference level of the minimum value to generate the branch metric to determine the recording data.

The Viterbi detector 5 may also be arranged so that, in case limitations are imposed on the maximum value of the equalization target level, a equalization target level of a second largest value is rendered the reference level of the maximum value to generate the branch metric to determine the recording data. The Viterbi detector 5 may similarly be arranged so that, in case the limitations are imposed on the minimum value of the equalization target level, the equalization target level of a second smallest value is rendered a reference level of the minimum value to generate the branch metric to determine the recording data. In limiting the maximum value of the equalization target level, the limiter circuit may limit the amplitude as an equalization target level of the second largest value is rendered an upper limit value. In limiting the minimum value of the equalization target level, the limiter circuit may limit the amplitude as an equalization target level of the second smallest value is rendered a lower limit value.

The information detection device may further include a coefficient controller 6 for the equalizer 3 taking charge of adaptive equalization of the PR channel. In case of a waveform distortion being of a large value, at least one out of the maximum value and the minimum value of the equalization target level is limited to perform adaptive equalization using an equalization error relevant to the reference level different from the reference level of the maximum or minimum value.

Figure 5:
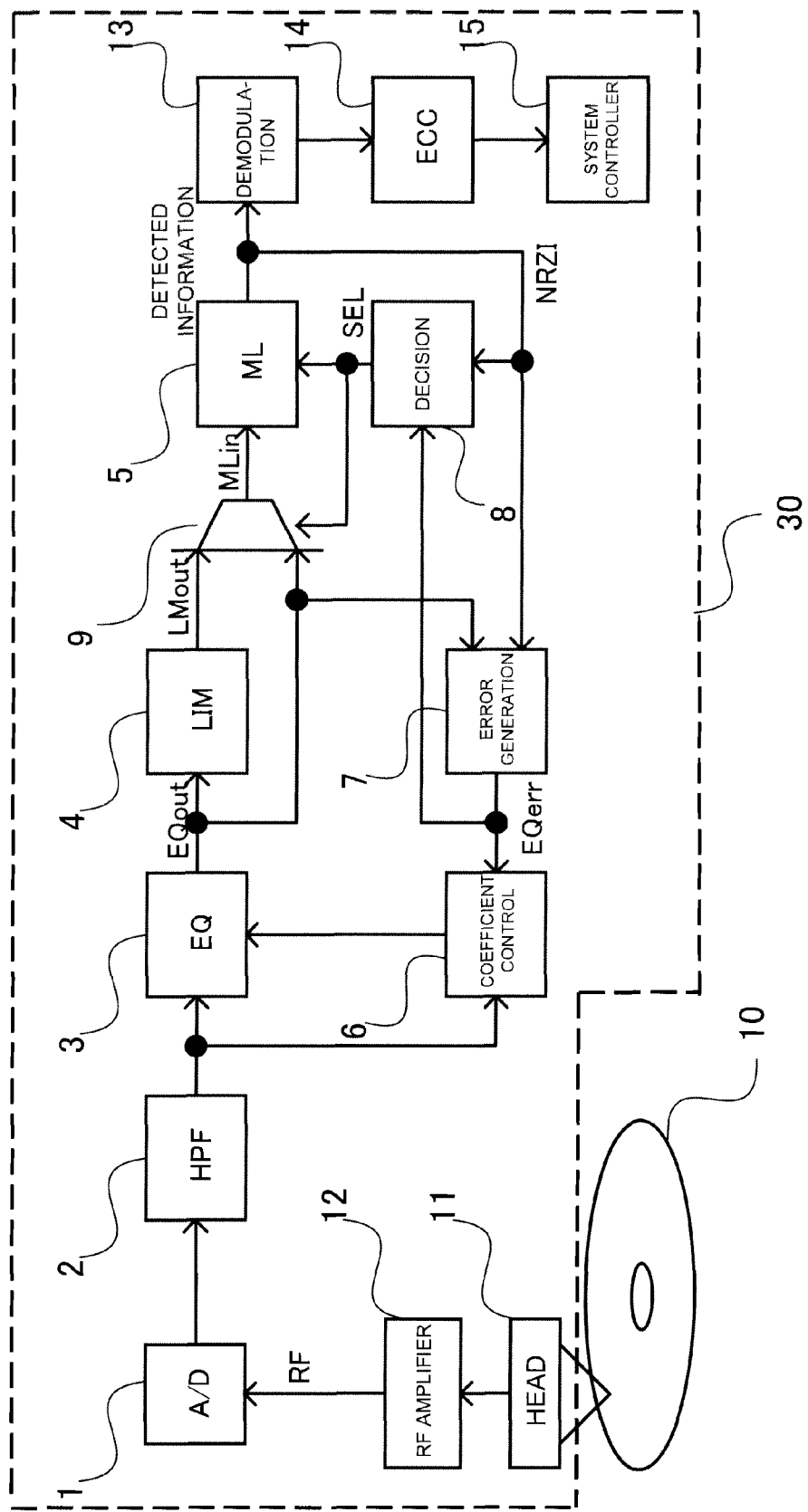
FIG. 5 is a block diagram showing a formulation of an optical disc device according to an Example of the present invention.

An optical disc device 30 for reading out the information recorded on an optical disc medium 10 according to an exemplary embodiment of the present invention includes an equalizer 3, a limiter circuit 4 and a Viterbi detector ML, as shown in FIG. 5. The equalizer 3 equalizes a readout signal obtained from a optical head 11 to a PR channel having equalization target levels of four or more values. The limiter circuit 4 limits an amplitude value of an output EQout of the equalizer 3 to a preset level. In determining recording data from an output LMout of the limiter circuit 4, the Viterbi detector 5 generates branch metrics as the equalization target levels of the four or more values less the equalization target levels having amplitude widths limited by the limiter circuit are used as reference levels. In the above formulation, such an optical disc device 30 may be provided which is able to optimally reproduce recorded data even in case the leading end of the mark suffers from distortion.

The optical disc device 30 may further include a distorted state decision unit 8 that decides on the value of distortion of the readout signal. In case the distorted state decision unit 8 has given a decision that distortion is small, the limiter circuit 4 may output an output signal of an equalizer, whose amplitude is not limited, to the Viterbi selector. The Viterbi detector then is not in a state of limiting the equalization target level. Viz., the limiter circuit 4 itself may be provided with the function of the selector circuit 9. By providing the distorted state decision unit 8, reproduction may be made satisfactorily, depending on and regardless of the presence or absence of distortion.

The optical disc device 30 may further include a distorted state decision unit 8 that decides on the value of distortion of the readout signal, and a selector 9. If the distorted state decision unit has given a decision that the value of distortion is large, the selector 9 selects an equalizer output signal LMout whose amplitude has been limited by the limiter circuit 4. In case the distorted state decision unit has given a decision that the value of distortion is small, the selector 9 selects an equalizer output signal EQout whose amplitude has not been limited by the limiter circuit 4. The so selected signal LMout or EQout is transmitted as an input signal to the Viterbi detector. If the equalizer output signal not limited by the limiter circuit EQout is the input signal to the Viterbi detector 5, no limitations may be imposed in the Viterbi detector 5 on the equalization target levels.

The schemata of an exemplary embodiment of the present invention are as described in the foregoing. Examples of the present invention will now be described with reference to the drawings.

Example

Figure 2:
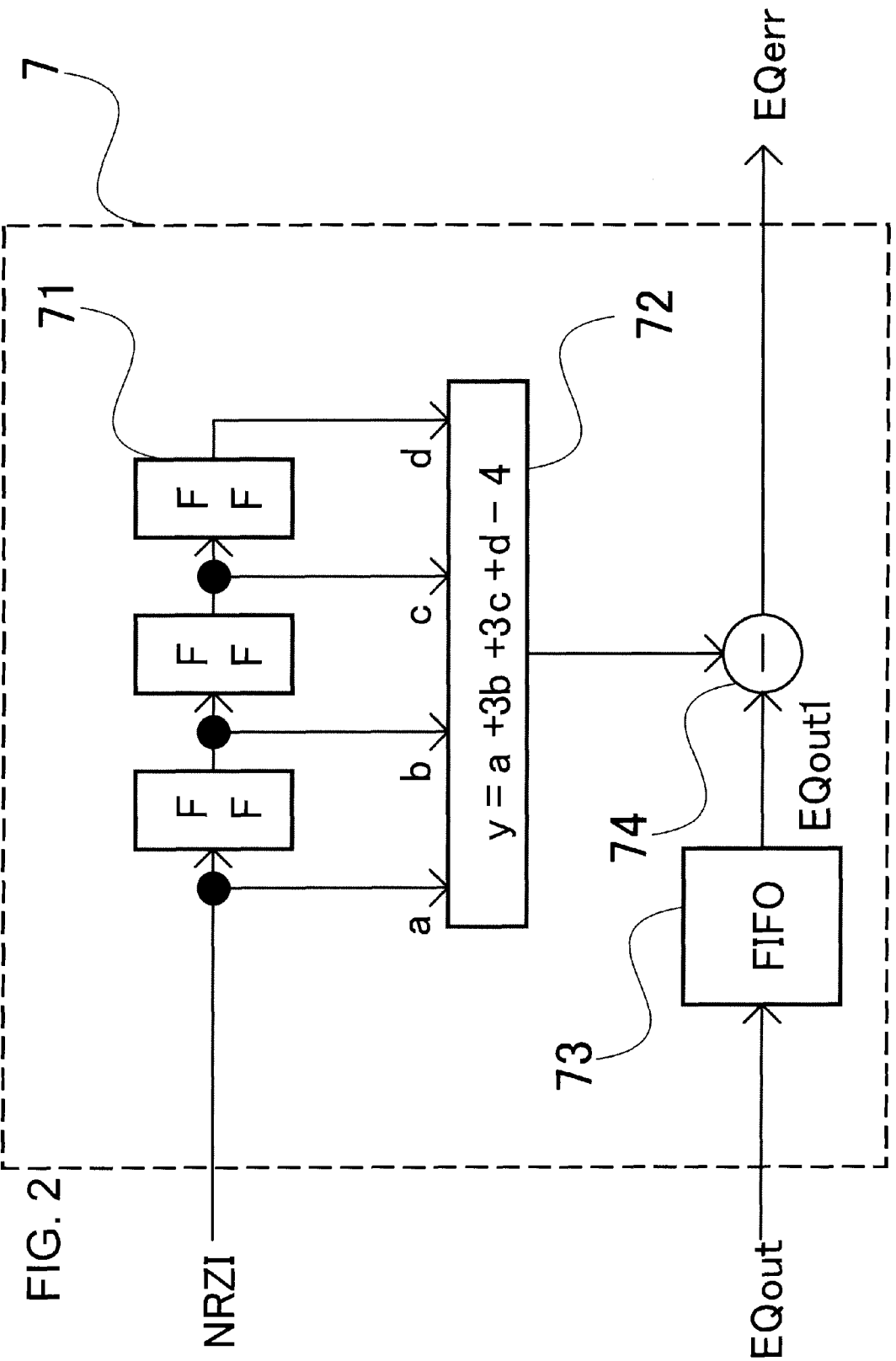
FIG. 2 is a block diagram showing a formulation of an equalization error generator in the Example of the present invention.

FIG. 1 depicts an arrangement of an information detection device 20 of the present invention. FIGS. 2 to 4 show details of sub-blocks used in the arrangement shown in FIG. 1. Referring to FIG. 1, the information detection device 20 initially processes a readout signal RF from a medium, not shown, by filtering using an anti-aliasing filter, also not shown. An A/D converter 1 of the information detection device 20 then samples the resulting signal into the digital information of 6 to 8 bit widths in timed relation to a channel clock. The sampling clock used in the A/D converter 1 may be generated by an analog PLL, not shown. Or, the filtered readout signal RF may first be sampled by a preset fixed clock and the resulting signal may then get its phase of interpolation controlled by a digital PLL, also not shown. A high-pass filter 2 of the information detection device 20 then corrects an offset in the digital information to deliver the so corrected digital information to an equalizer 3 exemplified by a FIR filter. The A/D conversion may be performed at back of the high-pass filter 2. Tap coefficients of the equalizer 3 are adaptively corrected by a coefficient controller 6 so as to be equalized e.g., to a PR (1, 3, 3, 1) channel (five equalization target levels of (±4, ±3, 0). At this time, an equalization error generator 7 generates an equalization error EQerr. The equalization error generator 7 inputs NRZI signal supplied by a Viterbi detector 5 and EQout signal supplied by the equalizer 3 and generates the equalization error EQerr. The coefficient controller 6, in turn, corrects the tap coefficients so that the correlation between the equalization error EQerr and an equalizer input will be as small as possible. The larger the number of taps of the equalizer 2, the higher is the degree of freedom. However, in consideration of the circuit volume, 9 or less taps are sufficient if the density is of the order of that of a DVD. The RLL code of the minimum run length d=1, used in a BD, may similarly be coped with, as in the DVD. An output signal EQout of the equalizer 3 is transmitted to a limiter circuit 4 which then performs the conversion. If a limiter circuit output is LMout, and the waveform distortion is in the plus direction, the conversion shown e.g., by the following equation (8), is carried out.

$$LMout = EQout \; (EQout < 3) \quad (8)$$
$$3 \; (EQout \geq 3)$$

If, with both polarities, the distortion is strong, the processing shown in the following equation (9) may be carried out:

$$LMout = EQout \; (|EQout| < 3) \quad (9)$$
$$3 \; (EQout \geq 3)$$
$$-3 \; (EQout \leq 3)$$

Although the limit threshold is set at ±3, it may, of course, be of any other suitable value. The limiter output LMout and the equalizer output EQout are transmitted to the selector 9 which then selects and outputs one of the outputs. This selection is by the distorted state decision unit 8. A selector output MLin is transmitted to the Viterbi detector 5.

The Viterbi detector 5 then generates the binary detection information NRZI by maximum likelihood detection. The Viterbi detector 5 generates branch metrics, with the equalization target levels of the equalizer 3 as reference levels, in determining recording data from an output EQout of the equalizer 3. The Viterbi detector 5 has a mode of generating the branch metrics and determining the recording data as limitations are imposed on at least one out of a maximum value and a minimum value of the equalization target levels. The limited maximum value of the reference level of the Viterbi detector 5 is preferably a second largest (equalization) target level of the target levels of the adaptive equalization. On the other hand, the limited minimum value of the reference level of the Viterbi detector is preferably its second smallest (equalization) target level. Of course, any desired value smaller than the maximum value of the reference level may be used as the maximum reference level, or any desired value larger than the minimum value of the reference level may be used as the minimum reference level. However, the above preferred arrangement has an advantage that it can be implemented by a smaller circuit. Although both the maximum and minimum reference levels may be changed, stronger distortion usually occurs in level on the polarity side for which the mark is generated. Hence, one out of the maximum and minimum reference levels gives rise to sufficient results.

The selector 9 may be dispensed with and the limiter circuit 4 may directly be coupled to the Viterbi detector 5. Two different threshold values for the limiter 4 may be provided and interchanged by the distorted state decision unit 8. Both the distorted state decision unit 8 and the selector 9 may also be dispensed with and the limiter 4 may directly be coupled to the Viterbi detector 5. However, if an input signal suffers less waveform distortion and its SNR is low, it is highly probable that the detection performance is enhanced in case the equalizer output signal is transmitted through the limiter to perform usual PRML detection. The limiter circuit 4 is not mandatory in case the waveform distortion mainly occurs in an amplitude decreasing direction. Of course, the selector 9 is unneeded in such formulation, and the signal SEL is transmitted solely to the Viterbi detector 5 to change over its operation.

FIG. 2 shows a formulation of the equalization error generator 7. A FIFO 73 imparts a delay, corresponding to a delay caused within the Viterbi detector 5, to an equalizer output EQout. A 4-channel-equivalent amount in the time domain of a Viterbi detector output NRZI is assembled by an 1T delay (flipflop) 71 and weighted by a filter 72 (an arithmetic unit) to yield an ideal value y. If no delay is superposed on a readout signal such that the signal has completely been equalized, an output of the FIFO 73 coincides with the output y. Hence, the equalization error EQerr representing a difference therebetween becomes equal to zero. This EQerr is usually not zero due to the noise or to non-linear distortion. Hence, adaptive equalization is carried out so that the EQerr error will be of a smallest value.

An example formulation of the distorted state decision unit 8 is shown in FIG. 3. If a long mark waveform of a positive (plus) polarity is distorted, as shown in FIG. 6, a timing of four consecutive NRZI=1 occurrences is generated by a 1T delay unit (flipflop) 81 and a decoder 82. The equalization error EQerr is selectively taken out and averaged by an averaging filter 83 to generate a signal V4. If this signal is lower than a preset threshold value Vth, a decision is given that the distortion is maximum. Although simple level decision suffices for the comparison by Vth, a hysteresis comparator 84 may be used to advantage since higher system stability may thereby be attained. The distorted state decision unit 8 may be implemented by a circuit because the unit is not required to perform high speed switching. The averaging and level detection processing may be implemented as a firmware F/W by a processor provided in connection with the information detection device 20. Or, the value of asymmetry, as detected by a separate circuit, may be detected as a level for detection.

FIG. 4 shows an example formulation of the Viterbi detector 5. An ASC circuit 52 receives branch metrics, generated by a branch metric generation circuit 51, and changes path metrics. The path selection information at this time is stored in a path memory 53 and a result is output. The present formulation differs from a conventional Viterbi detector in that a branch metric selector 54 is provided on a data path from the branch metric generation circuit 51 to the ASC circuit 52. In case of significant distortion, a path for $(x_n-4)^2$ of the branch metric selector 54 is disconnected by the signal SEL so that $(x_n-3)^2$ is output at all times. Hence, a maximum likelihood detection is carried out for the state transition shown in FIG. 11. If the limiter circuit 4 is implemented in accordance with the equation 9, a selector is also added to the data path of $(x_n+4)^2$ so that one out of $(x_n+3)^2$ and $(x_n+4)^2$ is selectively output. If the branch metric selector 54 is to switch between $(x_n-3)^2$ and $(x_n-4)^2$, it is only necessary to provide a sole selector in a conventional Viterbi detection circuit, thereby simplifying the formulation. For example, a $(x_n-$ 3.2)$^2$ may newly be generated for switching from $(x_n-4)^2$, however, the circuit volume then is obviously increased.

A PR (a, b, b, a), inclusive of PR(1, 3, 3, 1), or a PR(a, b, a), may be convenient as a target channel for adaptive equalization. Upper and lower limits of the equalized output may be limited. Viterbi detection may be carried out to advantage based on state transition of the PR(1, 1) channel in which the second largest target level of equalization and the second smallest target level of equalization are rendered a maximum level and a minimum reference level in the Viterbi detector respectively. Higher orders of PR (a, b, c, b, a) may also be used, however, the state transition becomes complicated in such case, with the result that, if the amplitude is limited by the limiter circuit, the performance is adversely lowered. It should be noted that the PR(1) channel has a binary equalization target level, while the PR (1, 1) channel has a ternary equalization target level. However, after equalization, no amplitude difference is demonstrated between a long mark and a short mark, and hence the advantage proper to the present invention is not demonstrated. Thus, the PR channel having four or more equalization targets is to be a subject of the present invention.

In FIG. 6, the amplitude of $x_n$ at the equalization target level 4 is lowered in amplitude, under the effect of waveform distortion, as a result of which the power of the equalization error relevant to the reference level 4 is increased. Hence, a tap coefficient controller performs coefficient control similar to that under an extremely noisy environment. There is thus a possibility that the intrinsic equalization performance may not be derived. The detection performance may, however, be improved by carrying out tap coefficient control at a timing other than that for the maximum or minimum equalization target level.

FIG. 5 shows an example formulation in which an information detection device of the present invention is applied to an optical disc device 30. In FIG. 5, parts or components which are the same in formulation as those in FIG. 5 are depicted by the same reference numerals and description thereof is dispensed with. An optical disc medium 10 is run in rotation under control by a spindle motor, not shown. A concentrated light beam is radiated to a surface of the optical disc medium 10 from a head (optical pickup, readout head or optical head) 11. Part of the reflected light is detected, via a photodetector, as a tracking signal and a focusing signal. The tracking signal and the focusing signal are each concentrated into a light beam so as to correctly follow a guide groove of the optical disc by an actuator servo, not shown. The remaining portion of the reflected light reads out miniaturized marks on the disc and is amplified by a waveform equalizer (RF amplifier) 12 so as to be taken out as a readout signal. This readout signal is passed through an analog filter, also not shown, so as to be sampled by an A/D converter 1 and thereby converted into the digital information of 6 to 8 bits wide in timed relation to the channel clock. The sampling clock used in the A/D converter 1 may be generated by an analog PLL, not shown, or may first be sampled by a preset fixed clock so as to then get its interpolation phase controlled by a digital PLL, also not shown. The digitized readout signal has its offset corrected by the high-pass filter 2 so as to be transmitted to the equalizer 3 exemplified by a FIR filter. The A/D conversion may be carried out at back of the HPF 2. Tap coefficients of the equalizer 3 are adaptively corrected by a coefficient controller 6 so as to be equalized to e.g., a PR (1, 3, 3, 1) channel (five equalization target levels of ±4, ±3, 0). At this time, an equalization error generator 7 generates an equalization error EQerr. The coefficient controller 6, in turn, corrects the tap coefficients so that the correlation between the equalization error EQcrr and an equalizer input will be as small as possible. The larger the number of taps of the equalizer 2, the higher is the degree of freedom. However, in consideration of the circuit volume, 9 or less taps are sufficient if the density is of the order of that of a DVD. The read channel may be PR (1, 2, 2, 1) or PR (3, 4, 4, 3). The RLL code of the minimum run length d=1, used in a BD, may similarly be coped with, as in the DVD. An output signal EQout of the equalizer 3 is transmitted to the limiter circuit 4 which then performs a conversion. If a limiter circuit output is LMout, and the waveform distortion is in the plus direction, the conversion shown e.g., by the equation (8) is carried out. The binary data, output from the maximum likelihood decoder 5, is demodulated by a demodulation circuit 13, and corrected for errors by an error correction unit 14 so as to be processed by the system controller 15 as the information exemplified by the video information. Although the formulation of FIG. 5 has been described in connection with an optical disc, the present Example may be used for playback processing in connection with an HDD device or a magnetic tape, or for a more generalized receiver baseband transmission system.

Figure 7:
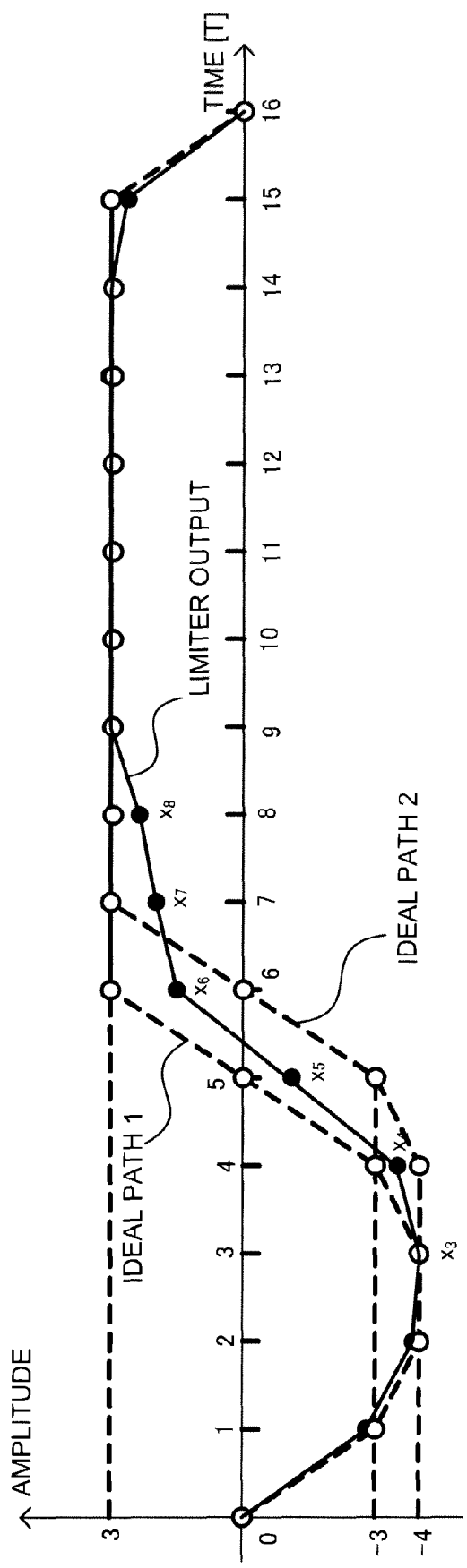
FIG. 7 is a graph showing a limiter output for a readout signal in which the leading end of a long mark has been recorded to a reduced thickness.

The operation of the present Example will now be described. FIG. 7 shows a limiter output in case the upper limit of the waveform of FIG. 6 is set at the amplitude 3. An ideal path 1 and an ideal path 2 are a correct solution path and an error path, in a status transition of FIG. 11, respectively. The values of path metrics of the respectively paths are calculated. Table 3 shows limiting processing in which, with the same inputs as those of Table 1 above as $x_n$, the limiting processing has been carried out for limiting $x_n$ to $x_n=3$ in case $x_n$ is three or more. It is seen that, as a consequence, the path metric value of the ideal path 1 becomes smaller thus allowing the correct path to be selected. This may be ascribable to the fact that the influence of the distortion relevant to the maximum reference level has been moderated. However, in this case, a similar meritorious effect may be obtained even in the absence of the limiter simply by carrying out Viterbi detection in the state transition of FIG. 11.

TABLE 3

| time n | $x_n$ | ideal path 1 $(r_n)$ | $(x_n - r_n)^2$ | ideal path 2 $(r2_n)$ | $(x_n - r2_n)^2$ |
|---|---|---|---|---|---|
| 3 | −4.1 | −4 | 0.01 | −4 | 0.01 |
| 4 | −3.5 | −3 | 0.25 | −4 | 0.25 |
| 5 | −1.1 | 0 | 1.21 | −3 | 3.61 |
| 6 | 1.5 | 3 | 2.25 | 0 | 2.25 |
| 7 | 2.0 | 3 | 1.0 | 3 | 1.0 |
| 8 | 2.2 | 3 | 0.64 | 3 | 0.64 |
| Σ | — | — | 5.36 | — | 7.76 |

Figure 9:
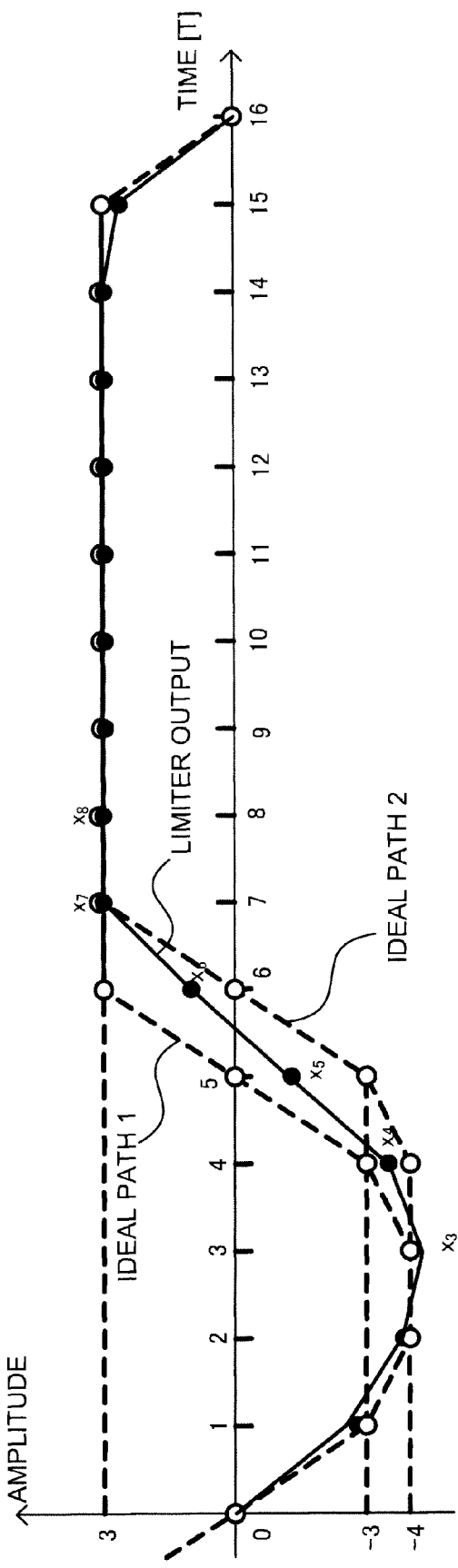
FIG. 9 is a graph showing a limiter output for a readout signal in which the leading end of a long mark has been recorded to a thicker thickness.

FIG. 9 shows a limiter output in case the upper limit of the waveform of FIG. 8 is set at an amplitude 3. An ideal path 1 and an ideal path 2 are a correct solution path and an error path, in a status transition of FIG. 11, respectively. The values of path metrics of the respective paths are calculated. Table 4 shows limiting processing in which, with the same input $x_n$ as those of Table 1 above, the limiting processing has been carried out for limiting $x_n$ to $x_n=3$ in case $x_n$ is three or more. It is seen that, as a consequence, the path metric value of the ideal path 2 becomes smaller thus allowing the correct path to be selected. This may be ascribable to the fact that the influence of the distortion has been reduced on account of the limiter circuit.

TABLE 4

| time n | $x_n$ | ideal path 1 $(r_n)$ | $(x_n - r_n)^2$ | ideal path 2 $(r2_n)$ | $(x_n - r2_n)^2$ |
|---|---|---|---|---|---|
| 3 | −4.1 | −4 | 0.01 | −4 | 0.01 |
| 4 | −3.5 | −3 | 0.25 | −4 | 0.25 |
| 5 | −1.2 | 0 | 1.44 | −3 | 3.24 |
| 6 | 1.0 | 3 | 4.0 | 0 | 1.0 |
| 7 | 3.0 | 3 | 0 | 3 | 0 |
| 8 | 3.0 | 3 | 0 | 3 | 0 |
| Σ | — | — | 5.7 | — | 4.5 |

Figure 10:
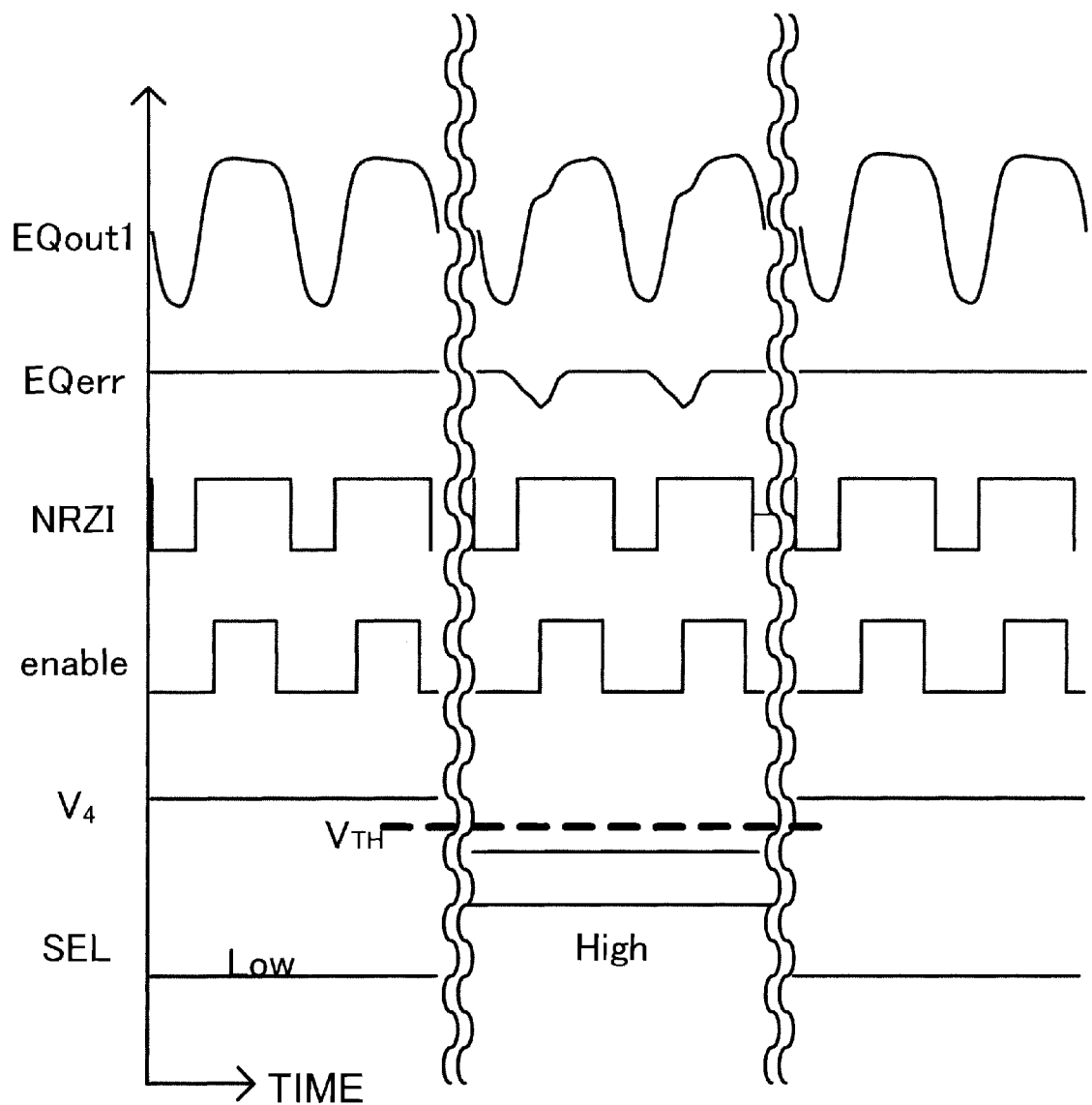
FIG. 10 is a timing diagram showing the operation of the distorted state decision unit.

The operation on the changeover signal SEL by the distorted state decision unit 8 will now be described with reference to a timing chart shown in FIG. 10. It is now supposed that a recording state be not optimum in a certain specified region on a disc, such that distortion has been produced in the amplitude at a leading end of a recording mark. The timing of occurrence of an equalization error for the equalization target level 4 is such a timing that "1"s occur on end for the duration of 3T in terms of the Viterbi detector output. Such timing may thus be generated as a signal 'enable' by decoding the Viterbi detector output. EQerr is sampled and averaged during the time the signal 'enable' becomes positive. It may then be seen to which extent the equalizer output for the equalization target level 4 is offset with a polarity (sign) from 4. If an output of the averaging means (averaging filter 83) is V4, the value of V4 is approximately zero in case there is no distortion. If the amplitude is lowered, the sign of V4 is negative. A hysteresis comparator, for example, may then be used to give a decision based on a threshold value to generate the changeover signal SEL.

In the above described Example, a recording medium including an optical disc, such as DVD or BD, may satisfactorily be reproduced even in case there is waveform distortion inclusive of that in the leading end of a mark. This may be realized by suppression of distortion by the limiter and by a change in branch metric generation at the time of Viterbi detection.

If a region suffering from distortion and a distortion-free region co-exist, both regions may be reproduced satisfactorily. The reason is that it is possible to identify the region suffering from distortion by the distorted state decision unit to change over the limiter and the Viterbi channel.

Although the Example of the present invention has been explained in the foregoing, the present invention is not to be restricted to the formulation of the Example described. It is to be noted that those skilled in the art may alter or correct it within the scope of the invention.

The present invention may broadly be applied for reproducing an information recording medium, and may be useful in particular for an optical disc reproducing device, inter alia, for a CD or a DVD. It should be noted that other objects, features and aspects of the present invention will become apparent in the entire disclosure and that modifications may be done without departing the gist and scope of the present invention as disclosed herein and claimed as appended herewith.

Also it should be noted that any combination or selection of the disclosed and/or claimed elements, matters and/or items may fall under the modifications aforementioned.

What is claimed is:

1. An information detection device for discriminating recording data from a readout signal of an information recording medium, comprising:
   an equalizer that equalizes said readout signal in a Partial Response PR channel having equalization target levels of four or more values; and
   a Viterbi detector that generates a branch metric, with said equalization target levels as reference levels, to determine recording data from an output of said equalizer; said Viterbi detector having a mode of generating said branch metric to determine said recording data by limiting at least one out of a maximum value and a minimum value of said equalization target levels.

2. The information detection device according to claim 1, further comprising:
   a limiter circuit that, when said Viterbi detector is in said mode of limiting to determine said recording data, limits an amplitude of said equalizer output to a preset level to transmit said equalized output thus limited in amplitude to said Viterbi detector.

3. The information detection device according to claim 1, further comprising:
   a distorted state decision unit that decides on an amount of distortion of said readout signal and, in case of said distortion being of a large value, sets said Viterbi detector to said mode of limiting to determine said recording data.

4. The information detection device according to claim 2, further comprising:
   a selector that receives an output of said equalizer and an output of said limiter circuit to select one out of said outputs to transmit the selected one to said Viterbi detector; and
   a distorted state decision unit that decides on an amount of distortion of said readout signal and, in case of said distortion being of a large value, sets said Viterbi detector to said mode of limiting to determine said recording data and sets said selector to select the output of said limiter circuit.

5. The information detection device according to claim 3, wherein,
   said distorted state decision unit averages out an equalization error for a specified pattern to generate an averaged output; said distorted state decision unit comparing said averaged output and a preset threshold value to each other to decide on said distortion value.

6. The information detection device according to claim 1, wherein
   upon limiting the maximum value of said equalization target level, said equalization target level of a second largest value is rendered a reference level of the maximum value to generate said branch metric to determine said recording data, and wherein
   upon limiting the minimum value of the equalization target level, said equalization target level of a second smallest value is rendered said reference level of the minimum value to generate said branch metric to determine said recording data.

7. The information detection device according to claim 2, wherein,
   upon limiting the maximum value of said equalization target level, said equalization target level of a second largest value is rendered said reference level of the maximum value to generate said branch metric to determine said recording data;

upon limiting the minimum value of said equalization target level, said equalization target level of a second smallest value is rendered said reference level of the minimum value to generate said branch metric to determine said recording data;

in limiting the maximum value of said equalization target level, said limiter circuit limits the amplitude as said equalization target level of the second largest value is rendered an upper limit value; and wherein, in limiting the minimum value of said equalization target level, said limiter circuit limits the amplitude as said equalization target level of the second smallest value is rendered a lower limit value.

8. The information detection device according to claim 1, further comprising:

a coefficient controller that causes said equalizer to adaptively equalize said PR channel; wherein in case of a waveform distortion being of a large value, at least one out of the maximum value and the minimum value of said equalization target level is limited to perform adaptive equalization using an equalization error relevant to the reference level different from the reference level of said maximum value or the reference level of said minimum value.

* * * * *